US012632850B2

(12) United States Patent
Cui et al.

(10) Patent No.:  US 12,632,850 B2
(45) Date of Patent:      May 19, 2026

(54) GRAPHIC CODE DISPLAY METHOD, TERMINAL AND STORAGE MEDIUM

(71) Applicant: GUANGDONG OPPO MOBILE TELECOMMUNICATIONS CORP., LTD., Dongguan (CN)

(72) Inventors: Yongming Cui, Dongguan (CN); Zhengtian Wang, Dongguan (CN); Congcong Yu, Dongguan (CN); Lei Qiu, Dongguan (CN); Kuang Ting Chuang, Dongguan (CN); Zhe Sun, Dongguan (CN); Chaochun Shuai, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 251 days.

(21) Appl. No.: 18/216,903

(22) Filed: Jun. 30, 2023

(65) Prior Publication Data

US 2023/0368177 A1      Nov. 16, 2023

Related U.S. Application Data

(63) Continuation of application No. PCT/CN2021/094670, filed on May 19, 2021.

(30) Foreign Application Priority Data

Dec. 31, 2020    (CN) .......................... 202011615564.8

(51) Int. Cl.
*G06Q 20/32*        (2012.01)
*G06F 3/01*         (2006.01)
*G06V 10/20*        (2022.01)

(52) U.S. Cl.
CPC ......... *G06Q 20/3274* (2013.01); *G06F 3/017* (2013.01); *G06V 10/255* (2022.01); *G06F 2200/1637* (2013.01)

(58) Field of Classification Search
None
See application file for complete search history.

(56) References Cited

U.S. PATENT DOCUMENTS

| | | |
|---|---|---|
| 10,607,732 B2 | 3/2020 | Xing et al. |
| 2012/0242818 A1* | 9/2012 | Chiang ................ H04N 23/682 348/E7.085 |

(Continued)

FOREIGN PATENT DOCUMENTS

| | | |
|---|---|---|
| CN | 105306670 A | 2/2016 |
| CN | 105704548 A | 6/2016 |

(Continued)

OTHER PUBLICATIONS

Chaoxiong Guan; CN-107633164-A; Payment Control Method, Apparatus, Computer Apparatus and Computer Readable Storage Medium; Jan. 26, 2018; English Translation; pp. 1-15 (Year: 2018).*

(Continued)

*Primary Examiner* — Cynthia Segura
(74) *Attorney, Agent, or Firm* — Sheppard, Mullin, Richter & Hampton LLP

(57)          ABSTRACT

A graphic code display method, a device, a terminal, and a storage medium are provided, belonging to the mobile payment field. An example method comprises: identifying an action, in an unlocked state, based on sensor data collected by a sensor; capturing an image by camera, in response to an identified pre-action, the pre-action being the action prior to displaying the graphic code to a code scanning device; detecting the code scanning device in the captured image to acquire detection result; and displaying the graphic code, in response to the detection result indi- (Continued)

cating that the image contains the code scanning device. A user only needs to show the pre-action for displaying a graphic code, and mobile terminal may automatically trigger to display the graphic code, without pre-opening an application and a graphic code display function, simplifying the graphic code display process.

20 Claims, 10 Drawing Sheets

(56) References Cited

U.S. PATENT DOCUMENTS

| | | | | |
|---|---|---|---|---|
| 2015/0120553 | A1 | 4/2015 | Li | |
| 2016/0048826 | A1* | 2/2016 | Fefferman | G06Q 20/208 |
| | | | | 705/23 |
| 2017/0316296 | A1* | 11/2017 | Ashiura | G06K 19/06028 |
| 2018/0157884 | A1* | 6/2018 | Visentin | G06Q 30/0239 |
| 2018/0300961 | A1* | 10/2018 | Müller | G06Q 20/18 |
| 2019/0147309 | A1* | 5/2019 | Hirano | H04W 8/005 |
| | | | | 726/5 |
| 2019/0208101 | A1* | 7/2019 | Gohl | H04N 23/61 |
| 2019/0251548 | A1* | 8/2019 | Chen | G06Q 20/3821 |
| 2021/0117948 | A1* | 4/2021 | Voss | G06Q 20/322 |
| 2022/0366386 | A1* | 11/2022 | Li | H04M 1/72454 |

FOREIGN PATENT DOCUMENTS

| | | | | | |
|---|---|---|---|---|---|
| CN | 106201287 | A | | 12/2016 | |
| CN | 107633164 | A | * | 1/2018 | ............ G06F 21/32 |
| CN | 107656684 | A | | 2/2018 | |
| CN | 109213326 | A | | 1/2019 | |
| CN | 109343779 | A | | 2/2019 | |
| CN | 109409162 | A | | 3/2019 | |
| CN | 110022409 | A | | 7/2019 | |
| CN | 110163319 | A | | 8/2019 | |
| CN | 110187759 | A | | 8/2019 | |
| CN | 110400138 | A | | 11/2019 | |
| CN | 110489048 | A | | 11/2019 | |
| CN | 111144877 | A | | 5/2020 | |
| WO | 2018166097 | A1 | | 9/2018 | |

OTHER PUBLICATIONS

Extended European Search Report dated Apr. 4, 2024 received in European Patent Application No. EP21912840.2.

International Search Report and Written Opinion dated Sep. 28, 2021 in International Application No. PCT/CN2021/094670. English translation attached.

Chinese First Office Action, Chinese Application No. 202180069719. 9, mailed Dec. 26, 2025 (21 pages).

* cited by examiner

| Sensor 101 | | Camera 104 | collect

Sensor data 102 → identify an action → Pre-action 103 shot

Image 105 detect a code scanning device

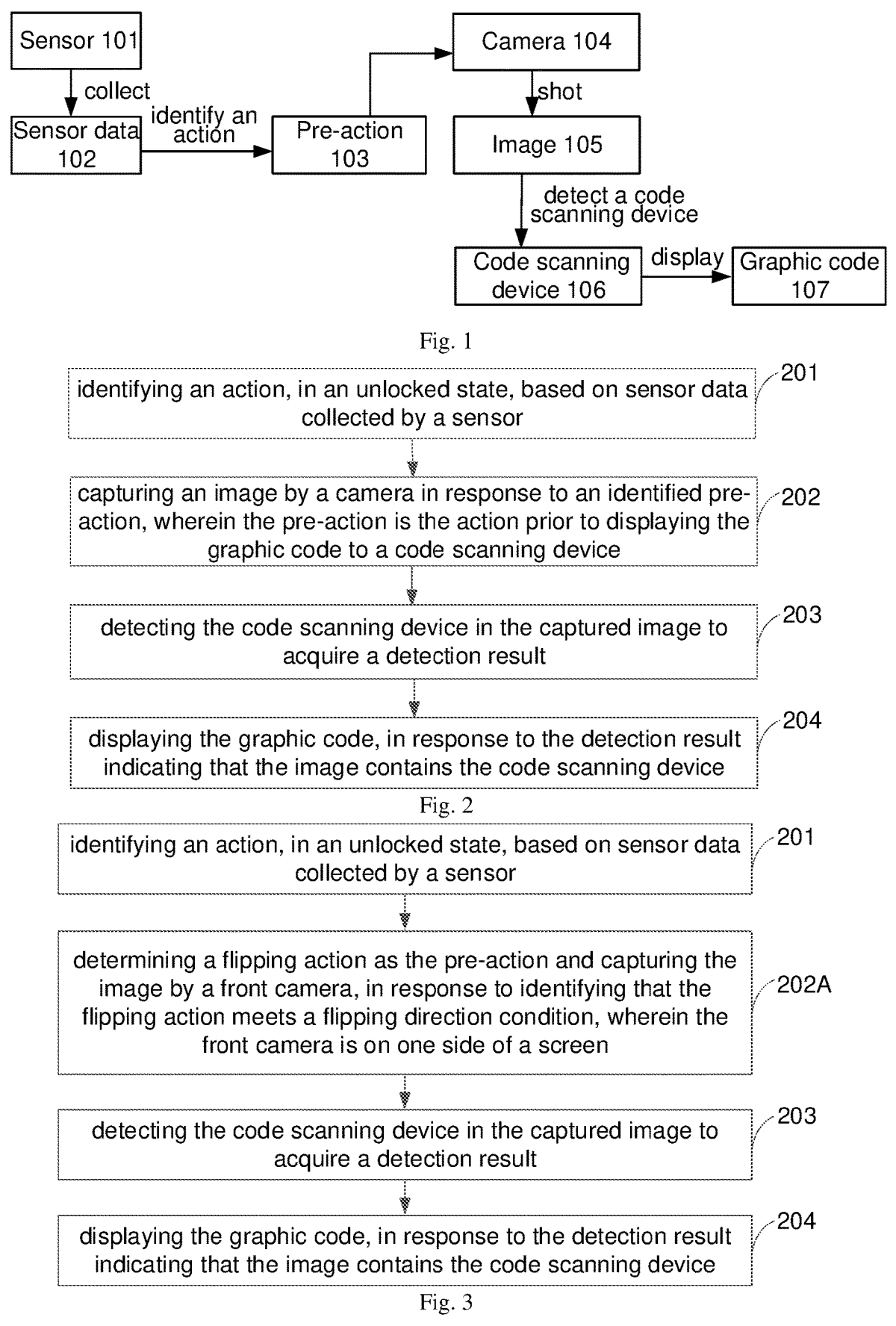

Code scanning device 106 → display → Graphic code 107

Fig. 1 identifying an action, in an unlocked state, based on sensor data collected by a sensor  ⌐201 capturing an image by a camera in response to an identified pre-action, wherein the pre-action is the action prior to displaying the graphic code to a code scanning device  ⌐202 detecting the code scanning device in the captured image to acquire a detection result  ⌐203 displaying the graphic code, in response to the detection result indicating that the image contains the code scanning device  ⌐204

Fig. 2 identifying an action, in an unlocked state, based on sensor data collected by a sensor  ⌐201 determining a flipping action as the pre-action and capturing the image by a front camera, in response to identifying that the flipping action meets a flipping direction condition, wherein the front camera is on one side of a screen  ⌐202A detecting the code scanning device in the captured image to acquire a detection result  ⌐203 displaying the graphic code, in response to the detection result indicating that the image contains the code scanning device  ⌐204

Fig. 3

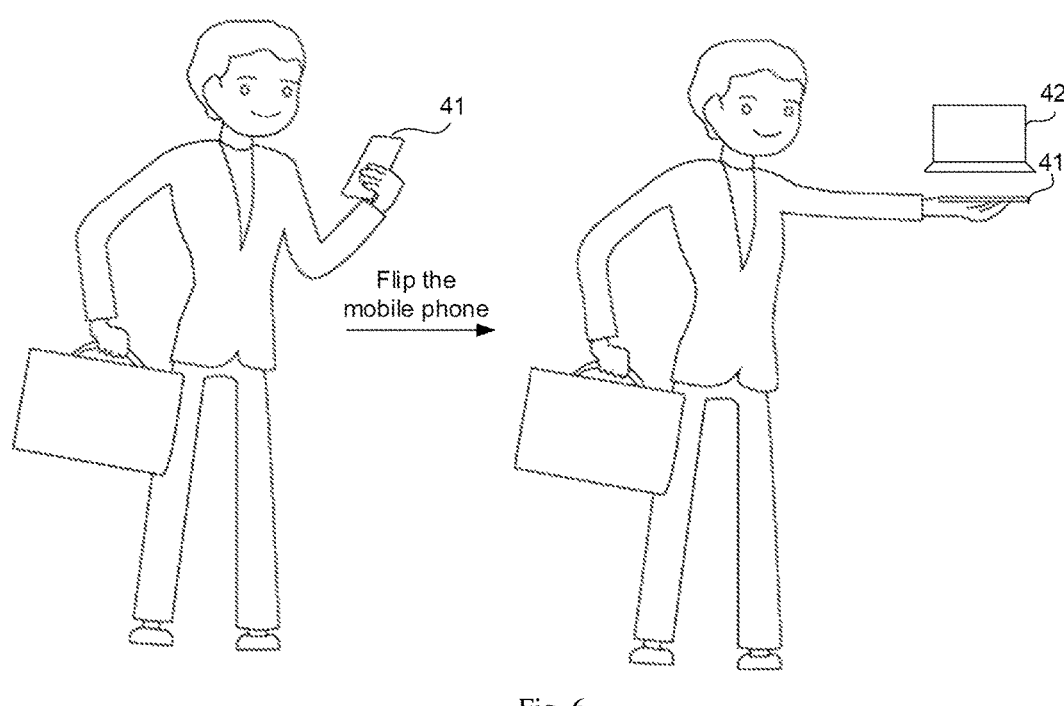

Fig. 6 identifying an action, in an unlocked state, based on sensor data collected by a sensor ⌐201 determining a shaking action as the pre-action and capturing the image by a front camera, the front camera being on one side of a screen, in response to the identified action being the shaking action in a preset direction and a number of the shaking action being a preset number ⌐202B determining a knocking action as the pre-action and capturing the image by the front camera, the front camera being on one side of the screen, in response to the identified action being the knocking action and a number of the knocking action being a preset number ⌐202C detecting the code scanning device in the captured image to acquire a detection result ⌐203 displaying the graphic code, in response to the detection result indicating that the image contains the code scanning device ⌐204

Fig. 7

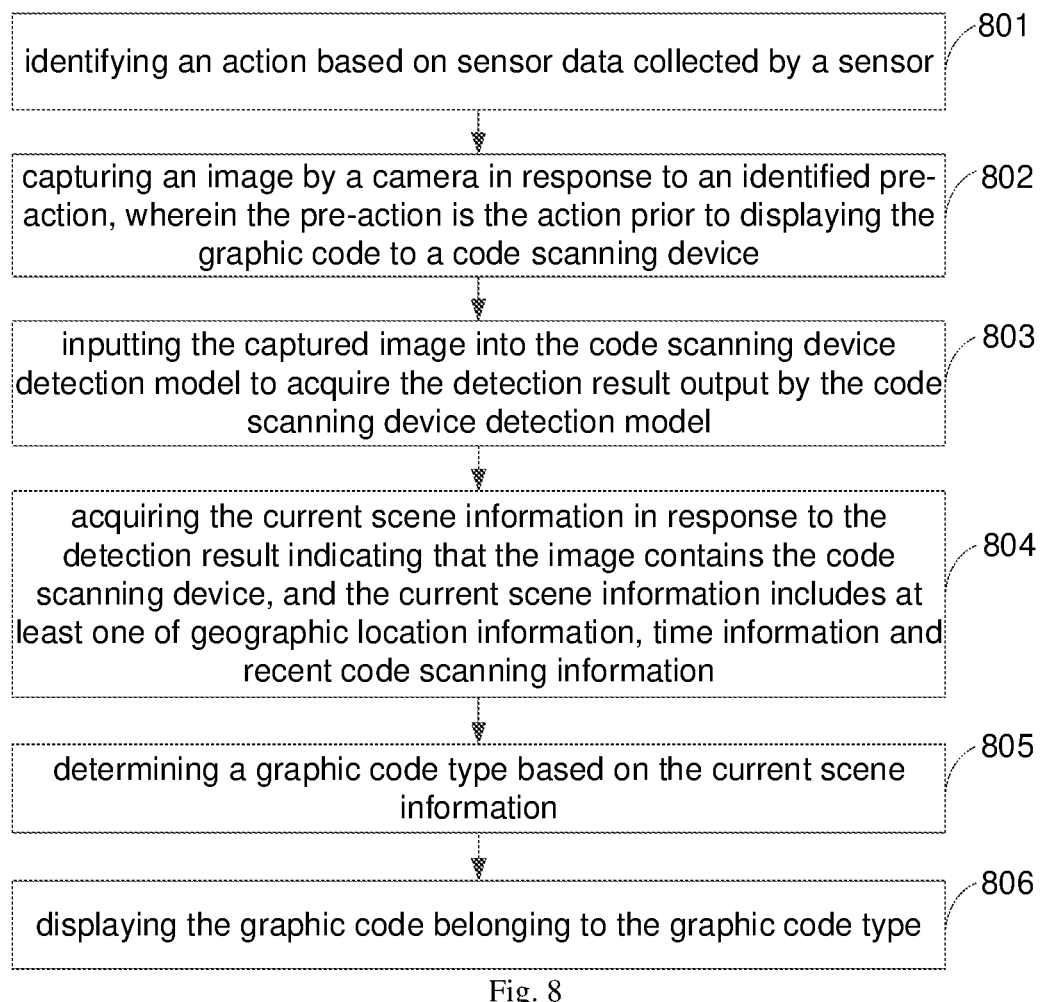

identifying an action based on sensor data collected by a sensor — 801 capturing an image by a camera in response to an identified pre-action, wherein the pre-action is the action prior to displaying the graphic code to a code scanning device — 802 inputting the captured image into the code scanning device detection model to acquire the detection result output by the code scanning device detection model — 803 acquiring the current scene information in response to the detection result indicating that the image contains the code scanning device, and the current scene information includes at least one of geographic location information, time information and recent code scanning information — 804 determining a graphic code type based on the current scene information — 805 displaying the graphic code belonging to the graphic code type — 806

Fig. 8

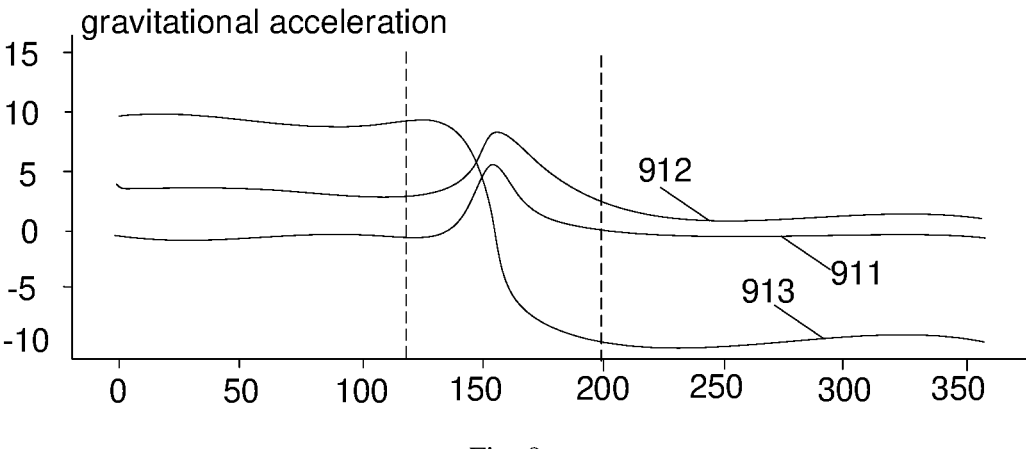

Fig. 9

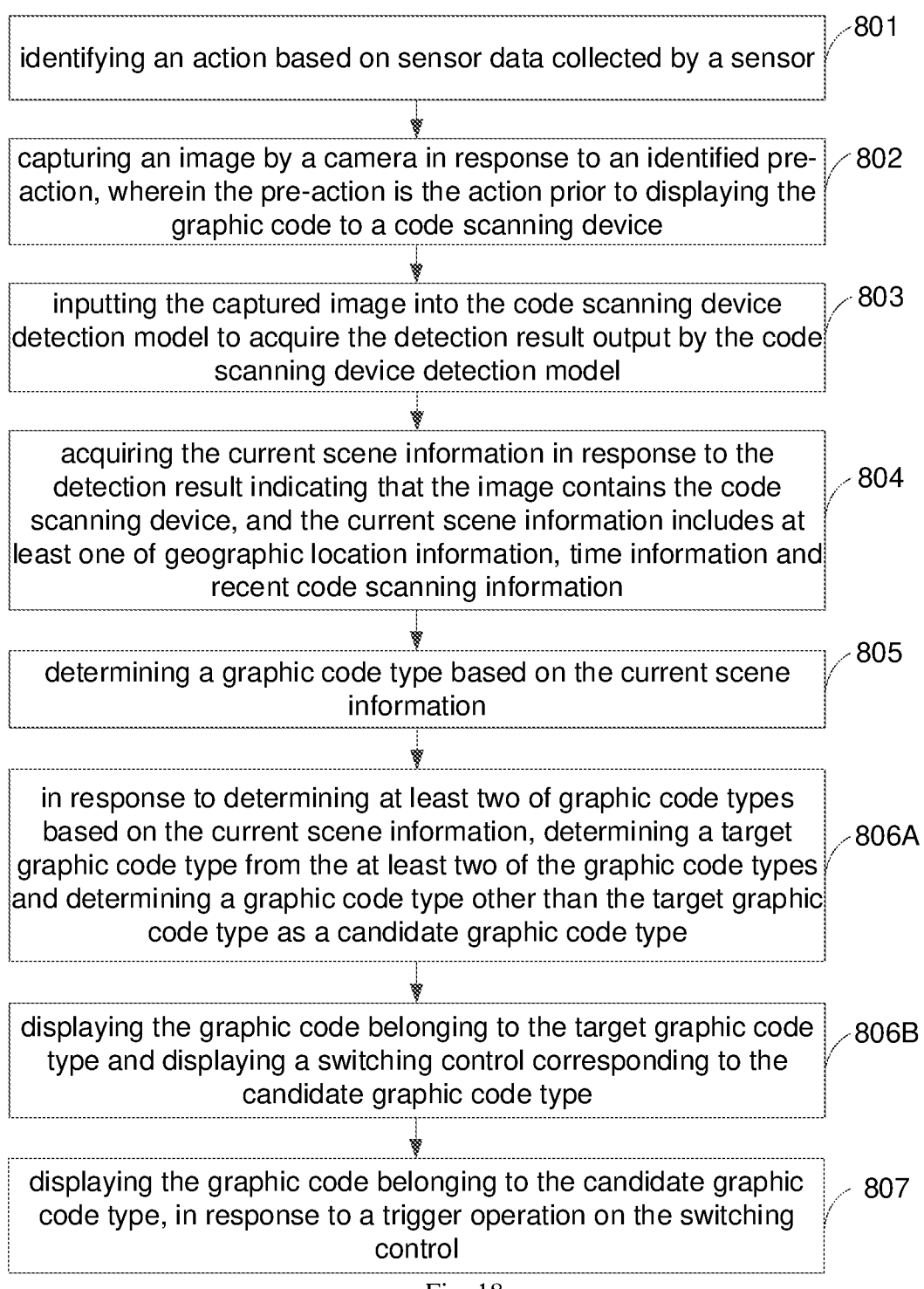

identifying an action based on sensor data collected by a sensor ⌐801 capturing an image by a camera in response to an identified pre-action, wherein the pre-action is the action prior to displaying the graphic code to a code scanning device ⌐802 inputting the captured image into the code scanning device detection model to acquire the detection result output by the code scanning device detection model ⌐803 acquiring the current scene information in response to the detection result indicating that the image contains the code scanning device, and the current scene information includes at least one of geographic location information, time information and recent code scanning information ⌐804 determining a graphic code type based on the current scene information ⌐805 in response to determining at least two of graphic code types based on the current scene information, determining a target graphic code type from the at least two of the graphic code types and determining a graphic code type other than the target graphic code type as a candidate graphic code type ⌐806A displaying the graphic code belonging to the target graphic code type and displaying a switching control corresponding to the candidate graphic code type ⌐806B displaying the graphic code belonging to the candidate graphic code type, in response to a trigger operation on the switching control ⌐807

Fig. 18

GRAPHIC CODE DISPLAY METHOD, TERMINAL AND STORAGE MEDIUM

CROSS-REFERENCE TO RELATED APPLICATION(S)

This application is a continuation of International Patent Application No. PCT/CN2021/094670, filed on May 19, 2021, which claims the priority of Chinese Patent Application No. 202011615564.8, filed on Dec. 31, 2020, both of which are herein incorporated by reference in their entirety.

TECHNICAL FIELD

Embodiments of the present disclosure relate to mobile payment technology, and more particular, to a graphic code display method, a terminal, and a storage medium.

BACKGROUND

With the continuous development of mobile payment technology, more and more users tend to use a mobile payment function of a terminal for offline payment. Common mobile payment methods of a terminal include displaying a payment code and scanning the payment code.

When using a terminal to display the payment code for payment, the user first needs to open the application with the mobile payment function, and then enter the payment code display entry of the application, so as to display the payment code to the code scanning device to complete the payment.

SUMMARY

Embodiments of the present disclosure provide a graphic code display method, a terminal and a storage medium. A described technical scheme is as follows.

In an aspect, an embodiment of the present disclosure provides a method for displaying a graphic code. The method comprises: identifying an action, in an unlocked state, based on sensor data collected by a sensor; capturing an image by a camera, in response to an identified pre-action, the pre-action being the action prior to displaying the graphic code to a code scanning device; detecting the code scanning device in the captured image to acquire a detection result; and displaying the graphic code, in response to the detection result indicating that the image contains the code scanning device.

In another aspect, an embodiment of the present disclosure provides a terminal. The terminal comprises: a processor and a memory; the memory configured to store instructions which, when executed by the processor, cause the one or more processors to identify an action, in an unlocked state, based on sensor data collected by a sensor; capture an image by a camera in response to an identified pre-action, wherein the pre-action is the action prior to displaying the graphic code to a code scanning device; detect the code scanning device in the captured image to acquire a detection result; and display the graphic code, in response to the detection result indicating that the image contains the code scanning device.

In another aspect, an embodiment of the present disclosure provides a non-transitory computer readable storage medium having stored instructions that is executed by a processor of a terminal, cause the processor of a terminal to identify an action, in an unlocked state, based on sensor data collected by a sensor; capture an image by a camera in response to an identified pre-action, wherein the pre-action is the action prior to displaying the graphic code to a code scanning device; detect the code scanning device in the captured image to acquire a detection result; and display the graphic code, in response to the detection result indicating that the image contains the code scanning device.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

FIG. 1 illustrates a principle diagram of a process for implementing a graphic code display method according to embodiments of the disclosure.

FIG. 2 illustrates a flowchart of a graphic code display method according to an exemplary embodiment of the disclosure.

FIG. 3 illustrates another flowchart of a graphic code display method according to an exemplary embodiment of the disclosure.

FIG. 6 illustrates another schematic diagram of a process for displaying the graphic code according to an exemplary embodiment of the disclosure.

FIG. 7 illustrates another flowchart of a graphic code display method according to an exemplary embodiment of the disclosure.

FIG. 8 illustrates another flowchart of a graphic code display method according to an exemplary embodiment of the disclosure.

FIG. 9 illustrates a schematic diagram of a change in gravitational acceleration data, when in the process of flipping the screen from upward to downward;

FIG. 18 illustrates another flowchart of a graphic code display method according to an exemplary embodiment of the disclosure.

DETAILED DESCRIPTION

Figure 4:
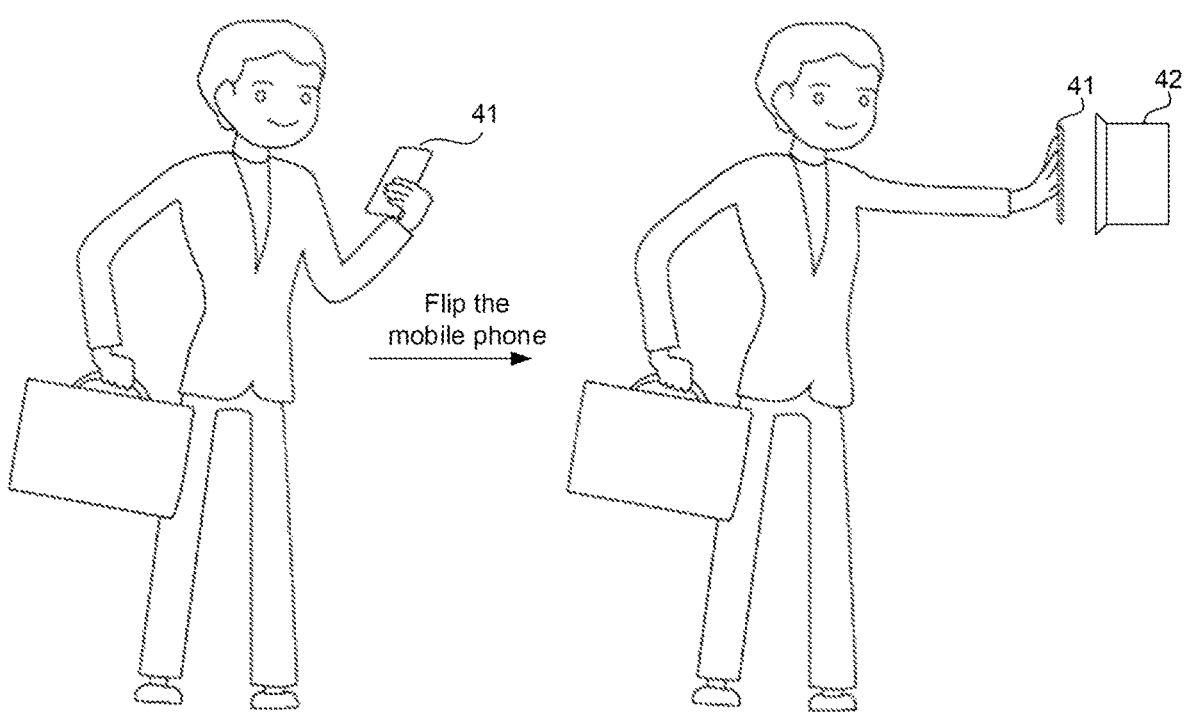
FIG. 4 illustrates a schematic diagram of a process for displaying the graphic code according to an exemplary embodiment of the disclosure.

In order to make objectives, technical solutions and advantages of the present disclosure clearer, implementations of the present disclosure will be further described in detail below in combination with the drawings.

In the description of the present disclosure, "plurality" means two or more. "And/or" describes an association relationship of associated objects, and means that there can be three kinds of relationships. For example, A and/or B may indicate that A exists alone, A and B exist at the same time, or B exists alone. The character "/" generally indicates that the contextual objects are in an "or" relationship.

In the related art, when using a graphic code display function, the user first needs to open the application with the graphic code display function, and then enter the graphic code display entry of the application to make the terminal display the graphic code, and then point the graphic code to the code scanning device so that the code scanning device can scan the graphic code.

In order to simplify the process for displaying the graphic code and to achieve the graphic code display without the user's perception (such as payment without perception), as shown in FIG. 1, an embodiment of the present disclosure provides a method for displaying a graphic code. The terminal acquires the sensor data 102 collected by the sensor 101 during the working state, and identifies an action based on the sensor data 102. When it is identified that the user has performed the pre-action 103 for displaying the graphic code, the terminal further captures images by the camera 104 and detects the code scanning device in the captured image 105. When the image 105 is detected to contain the code scanning device 106, the terminal automatically displays the graphic code 107.

During the entire graphic code display process, the user only needs to perform the pre-action of the graphic code display, and point the terminal screen to the code scanning device, and the terminal automatically triggers the display of the graphic code, without the need for the user to open the application and enter the graphic code display entry, which simplifies the graphic code display process. The graphic code display process will be described in detail below using exemplary embodiments.

Please refer to FIG. 2, which illustrates a flowchart of a graphic code display method provided by an exemplary embodiment of the present disclosure. The method includes blocks as follows.

At block 201, an action is identified, in an unlocked state, based on sensor data collected by a sensor.

In one possible implementation, when in a working state, the terminal continuously collects sensor data by the sensor, and identifies the action based on the sensor data. The sensor data may be collected by a single sensor, or may be collected by multiple sensors of different types. Correspondingly, the accuracy of identifying an action based on sensor data collected by multiple sensors is higher than the accuracy of identifying an action based on sensor data collected by a single sensor.

In some embodiments, in order to reduce the power consumption of the terminal and improve the security of the graphic code display, in the screen unlocked state, the terminal identifies action based on the sensor data; in the screen locked state, the terminal stops identifying action.

The terminal may also continue to identify an action in the locked state, which is not limited in embodiments of the present disclosure.

In some embodiments, Sensorhub is configured to set an action identification algorithm for identifying an action, which is used as a software and hardware solution based on a low-power Micro Controller Unit (MCU) and a light-weight Real Time Operating System (RTOS) for connecting and processing sensor data collected by various sensors. In some embodiments, a System on Chip (SoC) of the terminal is integrated with a Micro Controller Unit (MCU), where an operating system runs on the SoC, a Real Time Operating System (RTOS) runs on the MCU, and the MCU performs action identification based on the sensor data collected by the sensor.

At block 202, an image is captured by a camera, in response to an identified pre-action. The pre-action is an action prior to displaying the graphic code to a code scanning device.

In the disclosure embodiment, the first level condition that triggers the automatic display of the graphic code is the action condition. The terminal detects whether the identified action belongs to the pre-action. If it does, it determines that the action condition is satisfied, and the terminal captures the image by the camera. If it does not, it determines that the action condition is not satisfied, and the terminal continues to identify the action (with no need to perform a subsequent process).

In the disclosure embodiment, the pre-action is not a touch action on an interface element, i.e. it is not an action for the user interface displayed on the terminal screen. The pre-action is an action to adjust the orientation of the terminal screen based on the scanning direction of the code scanning device so that the graphic code displayed on the terminal screen is facing the scanning direction, rather than an action to wake up the screen or unlock the terminal. In some embodiments, the pre-action is a gesture action.

The pre-action is a trigger action set by default on the terminal. For example, the pre-action is a gesture action before the user normally displays the graphic code to the code scanning device; or the pre-action is a trigger action defined by the user, for example, the pre-action is a specific gesture action selected by the user from several candidate actions.

In one possible implementation, the terminal sends an interrupt to the SoC when it identifies that the user has performed the pre-action through an action identification algorithm, and the SoC instructs the camera to turn on and capture an image based on the interrupt.

As the graphic code displayed on the screen needs to be directly facing the code scanning device, the terminal captures an image through the front camera on one side of the screen; and in order to improve the success rate of subsequent detection of the code scanning device, the camera continuously captures multiple frames of images, or video shooting.

At block 203, detection result is acquired, by detecting the code scanning device in the captured image.

When using the terminal, the user may perform an action similar to the pre-action without the need to display the graphic code. In the disclosure embodiment, in order to reduce the false trigger probability of the graphic code, a second level condition that triggers the automatic display of the graphic code is the device condition, and the terminal scans the captured image to detect the code scanning device and acquires the detection result. The detection result is used to indicate whether a code scanning device exists directly in front of the terminal screen. If the detection result indicates that there is a code scanning device, the device condition is determined to be satisfied and the automatic display of the graphic code is triggered; if the detection result indicates that there is no code scanning device, the device condition is determined not to be satisfied and there is no need to display the graphic code.

In some embodiments, in addition to indicating whether there is a code scanning device, the detection result includes at least one of the device types of the identified code scanning device and the location of the code scanning device.

At block 204, the graphic code is displayed, in response to the detection result indicating that the captured image contains the code scanning device.

When it is detected that there is a code scanning device directly in front of the terminal screen, the terminal automatically displays the graphic code. The graphic code is dynamically determined according to the current scene, or the graphic code is preset by the user (e.g., a graphic code that is commonly use or in a specific application).

In some embodiments, according to the form of the graphic code, the graphic code may be a two-dimensional code or a barcode, etc.; according to the use of the graphic code, the graphic code may be a payment code, a membership code or a ride code, etc. The embodiment of the present disclosure does not limit the form and use of the graphic code.

In one possible embodiment, the terminal stops displaying the graphic code after the display duration reaches a preset duration, and reverts to the original user interface (i.e., the user interface displayed on the terminal before the execution of the pre-action). For example, the preset duration may be 5 seconds.

Obviously, with the solution provided by this embodiment, the user only needs to perform the pre-action, and point the terminal screen directly to the code scanning device, and then the terminal automatically displays the graphic code without cumbersome interface touch operations. Moreover, with the pre-action as a precondition, the terminal does not need to turn on the camera for a long time to capture images, reducing the overall power consumption of the terminal when the graphic code automatic display function is turned on.

In summary, in an implementation of this disclosure, the terminal identifies whether the user performs the pre-action by identifying an action on the sensor data collected by the sensor, and further captures an image by the camera when the pre-action is identified, and automatically displays the graphic code when the captured image is detected to contain the code scanning device. In the entire graphic code display process, the user only needs to perform the pre-action without pre-opening an application and the graphic code display function, simplifying the graphic code display process. Moreover, after identifying the pre-action, the terminal uses image identification technology for detecting the code scanning device, which helps to reduce the probability of mis-display of the graphic code, and improve the accuracy of the timing of the graphic code display and the security of the graphic code display.

In addition, in this embodiment, instead of continuously capturing an image by the camera in the unlocked state and detecting the code scanning devices in the captured images, the terminal determines the presence of a scanning demand and captures the image and identifies the code scanning device by setting the pre-action as a precondition for triggering the image when the presence of a pre-action is identified, which helps to avoid the waste of processing resources caused by capturing image and identifying the code scanning device, when there is no demand for code scanning, helps to reduce the power consumption of the terminal.

In some embodiments, the implementation process of capturing the image by the camera, in response to an identified pre-action, is as follows. The method may include determining a flipping action as the pre-action, and capturing the image by a front camera, in response to identifying that the flipping action meets a flipping direction condition, wherein the front camera is on one side of the screen.

In some embodiments, the implementation process of determining a flipping action as the pre-action and capturing an image by a front camera, in response to identifying that the flipping action meets a flipping direction condition is as follows. The method may include determining the flipping action as the pre-action, in response to identifying the flipping action in a vertical state, the flipping action indicating a change in screen orientation from a first direction to a second direction, the first direction and the second direction being relative directions; or determining the flipping action as the pre-action, in response to identifying the flipping action that changes from a vertical state to a horizontal state, with the screen facing downward in the horizontal state; or determining the flipping action as the pre-action, in response to identifying a flipping action that changes from a vertical state to a horizontal state, with the screen facing upward in the horizontal state.

In some embodiments, the implementation process of capturing an image by a camera, in response to an identified pre-action, is as follows. The method may include determining a shaking action as the pre-action, and capturing an image by a front camera, the front camera being on one side of screen, in response to the identified action being the shaking action in a preset direction, and number of the shaking action being a preset number; or determining a knocking action as the pre-action, and capturing an image by a front camera, the front camera being on one side of screen, in response to the identified action being the knocking action, and number of the knocking action being a preset number.

In some embodiments, the implementation process of identifying an action, when in an unlocked state, based on sensor data collected by a sensor, is as follows. The method may include acquiring N frames of gravitational acceleration data continuously collected by an accelerometer, each frame of the gravitational acceleration data containing an acceleration value in the three-axis direction, N being an integer greater than or equal to 2; inputting the N frames of gravitational acceleration data into an action identification model to acquire an action identification result output by the action identification model, the action identification model being a convolutional neural network model.

In some embodiments, the implementation process of inputting the N frames of gravitational acceleration data into an action identification model to acquire an action identification result output by the action identification model is as follows. The method may include, in response to a change of z-axis gravitational acceleration data from a first value to a second value in the N frames of gravitational acceleration data, inputting the N frames of gravitational acceleration data into the action identification model to acquire the action identification result output by the action identification model; OR in response to a change of z-axis gravitational acceleration data from a first value to a third value in the N frames of gravitational acceleration data and a change of x-axis gravitational acceleration data from the third value to the first value, inputting the N frames of gravitational acceleration data into the action identification model to acquire the action identification result output by the action identification model; OR in response to a change of z-axis gravitational acceleration data from a first value to a third value in the N frames of gravitational acceleration data and a change of y-axis gravitational acceleration data from the third value to the first value, inputting the N frames of gravitational acceleration data into the action identification model to acquire the action identification result output by the action identification model; OR in response to a change of z-axis gravitational acceleration data from a fourth value to a second value in the N frames of gravitational acceleration data and a change of y-axis gravitational acceleration data from the fourth value to a third value, inputting the N frames of gravitational acceleration data into the action identification model to acquire the action identification result output by the action identification model; OR in response to a change of x-axis gravitational acceleration data from a third value to a first value in the N frames of gravitational acceleration data and a change of y-axis gravitational acceleration data from a fourth value to a third value, inputting the N frames of gravitational acceleration data into the action identification model to acquire the action identification result, output by the action identification model; OR in response to a change of z-axis gravitational acceleration data from a fourth value to a third value in the N frames of the gravitational acceleration data, and a change of y-axis gravitational acceleration data from a fourth value to a first value, inputting the N frames of gravitational acceleration data into the action identification model to acquire the action identification result, output by the action identification model; OR in response to a change of z-axis gravitational acceleration data from a fourth value to a first value in the N frames of the gravitational acceleration data, and a change of y-axis gravitational acceleration data from a fourth value to a third value, inputting the N frames of gravitational acceleration data into the action identification model to acquire the action identification result output by the action identification model; wherein, the first value is greater than the fourth value, the fourth value is greater than the third value, the third value is greater than the second value, the first value and the fourth value are both positive values, the second value is a negative value.

In some embodiments, the implementation process of displaying the graphic code is as follows. The method may include acquiring current scene information, the current scene information including at least one of geographic location information, time information, and recent code scanning information; determining a graphic code type based on the current scene information; displaying graphic codes belonging to the graphic code type.

In some embodiments, the implementation process of determining graphic code type based on the current scene information is as follows. The method may include determining the graphic code type being a ride code, in response to the current scene information indicating a scene as a commuting scene, wherein, in the commuting scene, the geographic location information indicates a commuting ride station, and/or, the time information indicates a commuting time period, and/or, the recent code scanning information indicates a transportation inbound code information; determining the graphic code type being a payment code, in response to the current scene information indicating a commodity payment scene.

In some embodiments, the implementation process of displaying the graphic code belonging to the graphic code type is as follows. The method may include in response to determining at least two of the graphic code types based on the current scene information, determining a target graphic code type from the at least two of the graphic code types, and determining a graphic code type other than the target graphic code type as a candidate graphic code type; displaying the graphic code belonging to the target graphic code type, and displaying a switching control corresponding to the candidate graphic code type; wherein after the displaying the graphic code belonging to the graphic code type, the method further comprises: displaying the graphic codes belonging to the candidate graphic code type, in response to a trigger operation on the switching control.

In some embodiments, the implementation process of displaying the graphic code, further is as follows. The method may include acquiring a code scanning device type contained in the detection result, and determining the graphic code type matching the code scanning device type; displaying the graphic code belonging to the graphic code type.

In some embodiments, the implementation process of displaying the graphic code, further is as follows. The method may include determining a display position for the graphic code, based on an image position of the scanning device in the image, in response to the detection result indicating the image containing the code scanning device; displaying the graphic code at the display position.

In some embodiments, the implementation process of displaying the graphic code, further is as follows. The method may include displaying the graphic code, in response to the detection result indicating the image containing the code scanning device, and a size of the code scanning device in the image being greater than a size threshold.

In some embodiments, the implementation process of detecting the code scanning device in the captured image to acquire detection result is as follows. The method may include inputting the captured image into the code scanning device detection model to acquire the detection result output by the code scanning device detection model, wherein the code scanning device detection model being a mobile terminal convolutional neural network model, and a convolutional layer of the code scanning device detection model using depth separable convolution, and the code scanning device detection model being jointly trained with softmax loss and focal loss.

In one possible implementation, in order to reduce the learning cost for the user to use the automatic graphic code display function, the terminal sets the gesture action as the pre-action, which is the action before the user normally displays the graphic code to the code scanning device, so that the user may automatically display the graphic code and complete the code scanning by performing the regular graphic code display action without changing the user's habit of displaying the graphic code. On the basis of FIG. 2, the block 202 may be replaced with the block 202A as shown in FIG. 3.

At block 202A, a flipping action is determined as the pre-action and the image is captured by a front camera, in response to identifying that the flipping action meets a flipping direction condition. The front camera is on one side of the screen.

Usually, the user first displays the graphic code through a series of interface operations, and then flips the terminal to point the screen displaying the graphic code to the code scanning device, so that the code scanning device scans the graphic code.

Therefore, in the embodiment of the present disclosure, the terminal sets the flipping action before displaying the graphic code as the pre-action of the graphic code display.

Moreover, through the statistical analysis of the scanning mode of the code scanning device, it is found that the scanning direction of the code scanning device usually includes the forward, upward and downward directions. Correspondingly, when the scanning direction of the code scanning device is the forward direction, the user needs to flip the terminal so that the screen is located in front of the scanning device; when the code scanning direction of the scanning device is the upward direction, the user needs to flip the terminal so that the screen is located above the code scanning device; and when the code scanning direction of the code scanning device is the downward direction, the user needs to flip the terminal so that the screen is located below the code scanning device.

Therefore, in order to improve the identification accuracy of the pre-action, in this embodiment, the terminal determines the flipping action belonging to the flipping direction condition as the pre-action.

For the above-mentioned three different scanning directions of the code scanning device, the terminal identifies the pre-action may include the following possible implementations.

1. The terminal determines the flipping action as the pre-action, in response to identifying the flipping action in a vertical state and the flipping action indicating a change in screen orientation from a first direction to a second direction. The first direction and the second direction are relative directions.

When the scanning direction of the code scanning device is the forward direction, the regular scanning action of the user is to flip the terminal in the vertical state so that the screen of the terminal is flipped from facing the user to facing the code scanning device. Since the user is normally facing the code scanning device, the terminal determines that the flipping action belongs to the pre-action and the flipping action is used to display the graphic code to the code scanning device in the forward scanning direction, when the flipping action in the vertical state is identified and the flipping action indicates a change in the screen orientation from the first direction to the relative second direction.

It should be noted that the above-mentioned vertical state is not absolutely vertical. When the angle between the terminal screen and the vertical direction is less than a first angle threshold (e.g.) 30°, the terminal is considered to be in a vertical state; when the angle between the first direction and the second direction is greater than a second angle threshold (e.g.) 150°, the terminal determines that the first direction and the second direction are opposite directions.

For example, as shown in FIG. 4, in the process of using the mobile phone 41, when the user needs to show the payment code to the code scanning device 42 in the forward scanning direction, the user only needs to flip the mobile phone 41 so that the orientation of the screen changes from facing the user to facing the code scanning device 42. The mobile phone 41 captures the forward image through the front camera on one side of the screen, and automatically displays the payment code to complete the payment when the forward image is detected to contain the code scanning device 42.

2. The terminal determines the flipping action as the pre-action, in response to identifying the flipping action that changes from a vertical state to a horizontal state, with the screen facing downward in the horizontal state.

When the scanning direction of the code scanning device is the upward direction, the regular scanning action of the user is to flip the terminal from the vertical state to the horizontal state, so that the screen of the terminal faces downward and is located above the code scanning device. Therefore, the terminal further detects the screen orientation in the horizontal state when the flipping action is identified from the vertical state to the horizontal state. If the screen faces downward, the terminal determines that the flipping action belongs to the pre-action and the flipping action is used to display the graphic code to the code scanning device in the upward scanning direction.

It should be noted that the above-mentioned vertical state is not absolutely vertical. When the angle between the terminal screen and the vertical direction is less than a first angle threshold (e.g.,) 30°, the terminal is considered to be in a vertical state. And, the above-mentioned horizontal state is not absolutely horizontal. When the angle between the terminal screen and the horizontal direction is less than a third angle threshold (e.g.,) 30°, the terminal is considered to be in a horizontal state.

Figure 5:
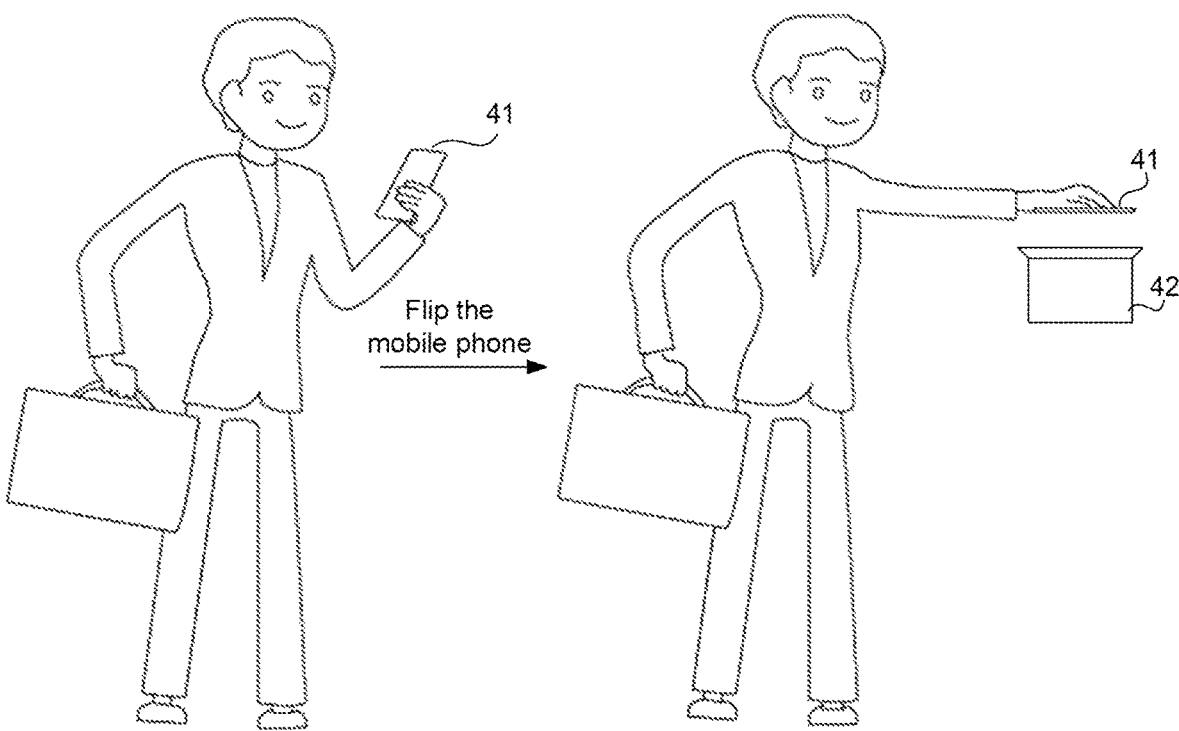
FIG. 5 illustrates another schematic diagram of a process for displaying the graphic code according to an exemplary embodiment of the disclosure.

For example, as shown in FIG. 5, in the process of using the mobile phone 41, when the user needs to show the payment code to the code scanning device 42 in the upward scanning direction, the user only needs to flip the mobile phone 41 so that the screen faces downward horizontally and towards the scanning area of the code scanning device. The mobile phone 41 captures the forward image through the front camera on one side of the screen and automatically displays the payment code to complete the payment when the forward image is detected to contain the code scanning device 42.

3. The terminal determines the flipping action as the pre-action, in response to identifying a flipping action that changes from a vertical state to a horizontal state, with the screen facing upward in the horizontal state.

When the scanning direction of the code scanning device is the downward direction, the regular scanning action of the user is to flip the terminal from the vertical state to the horizontal state, so that the screen of the terminal faces upward and is located below the code scanning device. Therefore, the terminal further detects the screen orientation in the horizontal state when the flipping action is identified from the vertical state to the horizontal state. If the screen faces upward, the terminal determines that the flipping action belongs to the pre-action and the flipping action is used to display the graphic code to the code scanning device in the downward scanning direction.

It should be noted that the above-mentioned vertical state is not absolutely vertical. When the angle between the terminal screen and the vertical direction is less than a first angle threshold (e.g.,) 30°, the terminal is considered to be in the vertical state. And the above-mentioned horizontal state is not absolutely horizontal. When the angle between the terminal screen and the horizontal direction is less than a third angle threshold (e.g.,) 30°, the terminal is considered to be in the horizontal state.

For example, as shown in FIG. 6, in the process of using the mobile phone 41, when the user needs to show the payment code to the code scanning device 42 in the downward scanning direction, the user only needs to flip the mobile phone 41 so that the screen faces upward horizontally and towards the scanning area of the code scanning device. The mobile phone 41 captures the forward image through the front camera on one side of the screen, and automatically displays the payment code to complete the payment when the forward image is detected to contain the code scanning device 42.

In this embodiment, the terminal achieves automatic display of the graphic code by setting the flipping action in the line with the user's habit of displaying the graphic code as the pre-action, without changing the user's existing habit of displaying the graphic code, which improves the efficiency of the graphic code display while reducing the learning cost of users for new functions.

In the daily use of the terminal, the user may perform an action similar to the graphic code display action without graphic code display demand. For example, a handheld mobile phone is placed flat on the desktop, and at this time if the phone triggers the camera to capture an image and detect the code scanning device, it will waste processing resources and increase the power consumption of the phone. In order to improve the identification accuracy of the demand for graphic code display, in another possible implementation, the terminal may set the gesture action different from the normal graphic code display as the pre-action. On the basis of FIG. 2, the block 202 may be replaced with block 202B or 202C as shown in FIG. 7.

At block 202B, a shaking action is determined as the pre-action and an image is captured by a front camera in response to the identified action being the shaking action in a preset direction and number of the shaking action being a preset number. The front camera is on one side of the screen.

In one possible implementation, the user may set the pre-action on demand when enabling the automatic display of the graphic code, wherein the pre-action may be selected from candidate actions, or the pre-action is customized by the user on the basis of the candidate actions, or the pre-action is completely user-defined.

In some embodiments, if the pre-action is user-defined, the terminal needs to set the action identification algorithm corresponding to the pre-action in Sensorhub; if the pre-action is selected from the candidate actions, the terminal needs to enable the action identification algorithm corresponding to the candidate actions in Sensorhub.

In this embodiment, the pre-action may be a shaking action, wherein the shaking direction of the shaking action is a preset direction and the number of the shaking action is a preset number. For example, the shaking direction may be left and right shaking, up and down shaking, back and forth shaking (based on the vertical state), the number of shaking action may be 2, 3, etc.

At block 202C, a knocking action is determined as the pre-action, and an image is captured by the front camera, in response to the identified action being the knocking action and number of the knocking action being a preset number. The front camera is on one side of the screen.

In addition to the shaking action, in this embodiment, the pre-action may be a knocking action, which may be a knocking action on the back cover of the terminal, or a knocking action on the screen or a knocking action on any terminal edge frame. The number of knocking action is a preset number. For example, the pre-action may be two knocks on the back cover of the terminal.

It should be noted that this embodiment is only illustrated by shaking action and knocking action. In other possible implementations, the user may set other forms of the pre-action as required; this implementation does not constitute a limitation.

In addition, in order to further improve the identification accuracy of the demand for graphic code display, in one possible implementation, the terminal may set "shaking action+flipping action" or "knocking action+flipping action" as the precondition for capturing image, which is not repeated in this implementation.

The graphic code to be displayed by the user using the terminal may vary in different application scenes. For example, when buying a commodity, the user needs to use the terminal to display the payment code. When taking transportation, the user needs to use the terminal to display the ride code. In order to improve the accuracy of automatic display of the graphic code in different application scenes, in this disclosure embodiment, the terminal needs to determine the graphic code that meets the current application scene based on the application scene from at least two graphic codes that are supported for display, and display the graphic code. Exemplary embodiments are below for illustration.

FIG. 8 illustrates a flowchart of a graphic code display method provided in another exemplary embodiment of the present disclosure. The method may include the following.

At block 801, action is identified based on sensor data collected by a sensor.

In one possible implementation, when the accelerometer set in the terminal has a three-axis gravitational acceleration data capture function, the terminal acquires N frames of gravitational acceleration data continuously collected by the accelerometer, so as to input the N frames of gravitational acceleration data into the action identification model and acquire the action identification result output by the action identification model.

The accelerometer collects gravitational acceleration data at a sampling frequency during operation. Each frame of gravitational acceleration data contains acceleration values in the triaxial direction (i.e., acceleration values in six directions: front, back, left, right, up and down), wherein N is an integer greater than or equal to 2.

For example, the accelerometer collects gravitational acceleration data with a sampling frequency of 100 Hz, i.e., 100 frames of gravitational acceleration data are collected per second. The terminal takes 20 frames as a sampling window size and inputs the 20 consecutive frames of gravitational acceleration data in the sampling window to the action identification model, which performs the identification action.

In one possible implementation, the action identification model is a pre-trained convolutional neural network model. In the process of training the action identification model, an initial model is trained with positive samples of the sensor data collected by the sensor when the pre-action is met and negative samples of the sensor data collected by the sensor when the pre-action is not met. Finally, the trained action identification model meets the action identification accuracy requirement.

In the daily use of the terminal, the pre-action only accounts for a very small portion, and if the gravitational acceleration data is continuously input to the action identification model in the unlocked state, then the action identification model will identify a large number of invalid actions, resulting in a waste of processing resources and bringing additional power consumption to the terminal. In order to reduce the power consumption of the terminal while ensuring the identification accuracy of the pre-action, in one possible implementation, the terminal filters the gravitational acceleration data, filters out the filtered gravitational acceleration data that obviously does not belong to the pre-action, and inputs the gravitational acceleration data (i.e., the gravitational acceleration data that may belong to the pre-action) into the action identification model for further identification.

In some embodiments, when the pre-action is the flipping action, the flipping action usually comprises at least one of the following: flipping the screen from upward to downward, flipping the screen from upward to forward horizontal, flipping the screen from upward to forward vertical, flipping the screen from backward vertical to downward state, flipping the screen from backward vertical to forward horizontal, flipping the screen from backward vertical to forward vertical, and flipping the screen from backward vertical to upward.

In one possible implementation, the terminal filters the gravitational acceleration data and identifies action on the filtered gravitational acceleration data by the action identification model including the following.

1. The screen is flipped from upward to downward.

In response to a change of z-axis gravitational acceleration data from a first value to a second value in the N frames of gravitational acceleration data, the N frames of gravitational acceleration data are inputted into the action identification model to acquire the action identification result output by the action identification model.

FIG. 9 illustrates the change of gravitational acceleration data during the process of flipping the screen from upward to downward. The horizontal axis indicates the number of frames of the sampled frames, the vertical axis indicates the value of the gravitational acceleration data, the first curve 911 indicates the x-axis gravitational acceleration data, the second curve 912 indicates the y-axis gravitational acceleration data, and the third curve 913 indicates the z-axis gravitational acceleration data.

As can be seen from FIG. 9, in a first stage (frame 0 to frame 120), the terminal is in the stable state with the screen facing upward, the values of z-axis gravitational acceleration data are close to 9.8. In a second stage (frame 120 to frame 200), the terminal is in the process of flipping the screen up and down, and the gravitational acceleration data in all three axes change substantially. In a third stage (frame 200 to frame 360), the terminal is in a stable state with the screen facing downward, the values of z-axis gravitational acceleration data are close to −9.8, while the values of the gravitational acceleration data on x-axis and y-axis are essentially the same as in the first stage.

Therefore, in one possible implementation, when the values of z-axis gravitational acceleration data in the N frames (e.g., 100 frames) gravitational acceleration data is detected to change from the first value to the second value, the terminal determines that it may flip the screen from upward state to downward state, and input the N frames gravitational acceleration data into the action identification model for action identification. The first value is greater than the second value and the first value is positive and the second value is negative; for example, first value is 9.8 and the second value is −9.8.

2. The screen is flipped from upward to forward horizontal.

In response to a change of z-axis gravitational acceleration data from a first value to a third value in the N frames of the gravitational acceleration data, and a change of x-axis gravitational acceleration data from a third value to a first value, the N frames of gravitational acceleration data are inputted into the action identification model to acquire the action identification result output by the action identification model.

Figure 10:
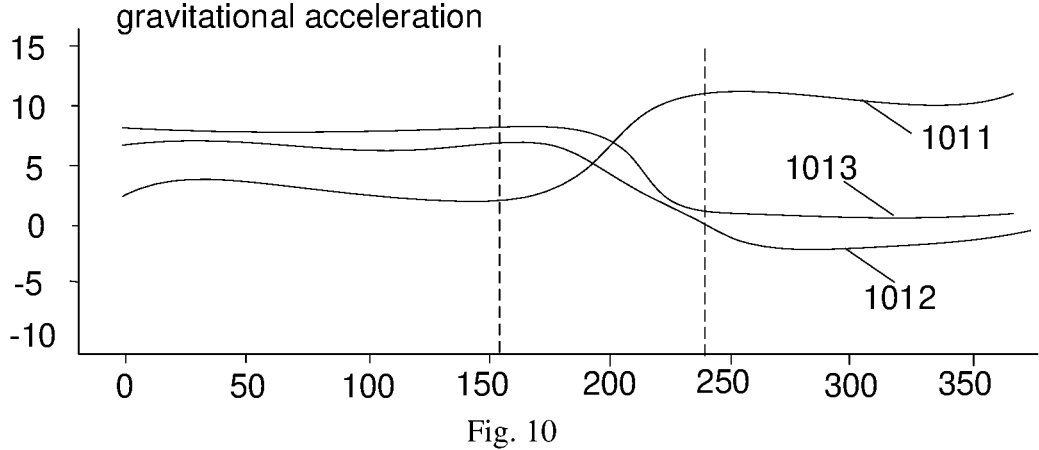
FIG. 10 illustrates a schematic diagram of a change in gravitational acceleration data, when in the process of flipping the screen from upward to forward horizontal.

FIG. 10 illustrates the change of gravitational acceleration data during the process of flipping the screen from upward to forward horizontal. The horizontal axis indicates the number of frames of the sampled frames, the vertical axis indicates the value of the gravitational acceleration data, the first curve 1011 indicates the x-axis gravitational acceleration data, the second curve 1012 indicates the y-axis gravitational acceleration data, and the third curve 1013 indicates the z-axis gravitational acceleration data.

It can be seen from FIG. 10, in a first stage (frame 0 to frame 150), the terminal is in the stable state with the screen facing upward, the values of z-axis gravitational acceleration data are close to 9.8, and the values of x-axis gravitational acceleration data are close to 0. In a second stage (frame 150 to frame 230), the terminal is in the process of flipping the screen upward to forward horizontal, during the flipping process, the gravitational acceleration data in the x-axis, y-axis and z-axis change substantially. In a third stage (frame 230 to frame 360), the terminal is in the stable state with the screen facing forward horizontal, the values of z-axis gravitational acceleration data are close to 0, while the values of the x-axis gravitational acceleration data are close to 9.8.

Therefore, in one possible implementation, when it is detected that the values of the z-axis gravitational acceleration data in the N frames gravitational acceleration data change from the first value to the third value and the values of the x-axis gravitational acceleration data change from the third value to the first value, the terminal determines that it may flip the screen from upward to forward horizontal, and input the N frames gravitational acceleration data into the action identification model for action identification. Wherein, the first value is greater than the third value the first value is positive, for example, the first value is 9.8 and the third value is 0.

3. The screen is flipped from upward to forward vertical.

In response to a change of z-axis gravitational acceleration data from a first value to a third value in the N frames of the gravitational acceleration data and a change of y-axis gravitational acceleration data from a third value to a first value, the N frames of gravitational acceleration data are inputted into the action identification model to acquire the action identification result output by the action identification model.

Figure 11:
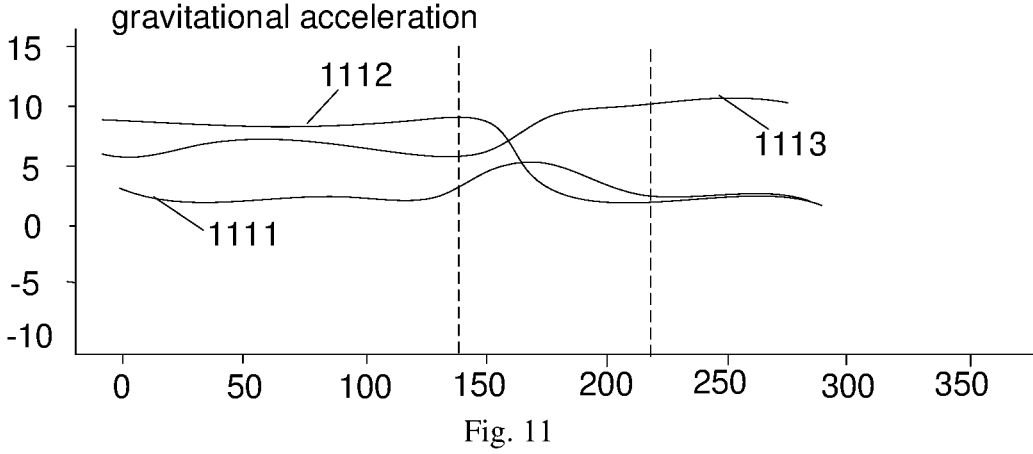
FIG. 11 illustrates a schematic diagram of a change in gravitational acceleration data, when in the process of flipping the screen from upward to forward vertical.

FIG. 11 illustrates the change of gravitational acceleration data during the process of flipping the screen from upward to forward vertical. The horizontal axis indicates the number of frames of the sampled frames, the vertical axis indicates the value of the gravitational acceleration data, the first curve 1111 indicates the x-axis gravitational acceleration data, the second curve 1112 indicates the y-axis gravitational acceleration data, and the third curve 1113 indicates the z-axis gravitational acceleration data.

It can be seen that in a first stage (frame 0 to frame 150), the terminal is in a stable state with the screen facing upward, the values of z-axis gravitational acceleration data are close to 9.8, the values of x-axis gravitational acceleration data are close to 0. In a second stage (frame 150 to frame 230), the terminal is in the process of flipping the screen from upward to forward vertical, during the flipping process, the values of gravitational acceleration data in the three axes of x-axis, y-axis and z-axis are changing substantially. In a third stage (frame 230 to frame 360), the terminal is in the stable state with the screen facing forward vertical, the values of z-axis gravitational acceleration data are close to 0, while the values of the y-axis gravitational acceleration data are close to 9.8.

Therefore, in one possible implementation, when it is detected that the values of the z-axis gravitational acceleration data in the N frames gravitational acceleration data change from the first value to the third value and the values of the y-axis gravitational acceleration data change from the third value to the first value, the terminal determines that it may flip the screen from upward to forward vertical, and input the N frames gravitational acceleration data into the action identification model for action identification. Wherein, the first value is greater than the third value, the first value is positive, for example, the first value is 9.8 and the third value is 0.

4. The screen is flipped from backward vertical to downward.

In response to a change of z-axis gravitational acceleration data from a fourth value to a second value in the N frames of gravitational acceleration data, and a change of y-axis gravitational acceleration data from a fourth value to a third value, the N frames of gravitational acceleration data are inputted into the action identification model to acquire the action identification result output by the action identification model.

Figure 12:
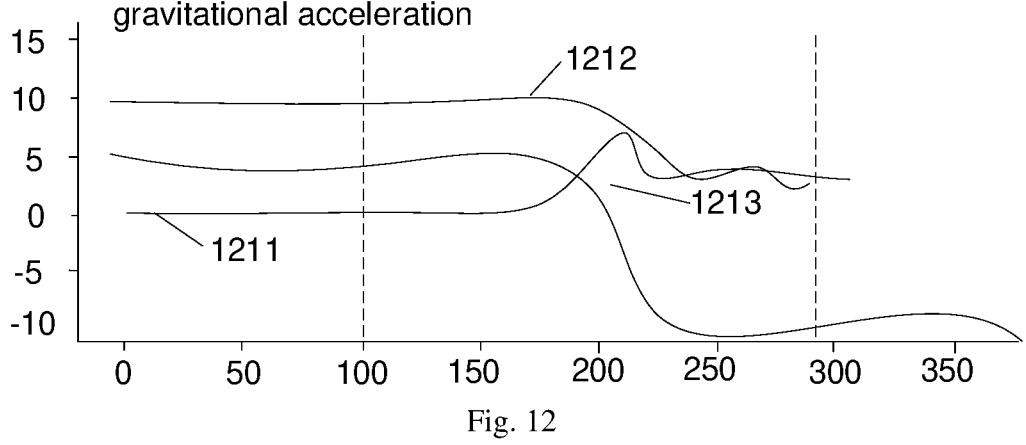
FIG. 12 illustrates a schematic diagram of a change in gravitational acceleration data, when in the process of flipping the screen from back vertical to downward.

FIG. 12 illustrates the change of gravitational acceleration data during the process of flipping the screen from backward vertical to downward. The horizontal axis indicates the number of frames of the sampled frames, the vertical axis indicates the value of the gravitational acceleration data, the first curve 1211 indicates the x-axis gravitational acceleration data, the second curve 1212 indicates the y-axis gravitational acceleration data, and the third curve 1213 indicates the z-axis gravitational acceleration data.

It can be seen that in a first stage (frame 0 to frame 100), the terminal is in the stable state with the screen facing backward vertical, the values of y-axis gravitational acceleration data are normally greater than 5, the values of z-axis gravitational acceleration data fluctuate around 5. In a second stage (frame 100 to frame 280), the terminal is in the process of flipping the screen from backward vertical to downward, during the flipping process, the values of gravitational acceleration data in the three axes of x-axis, y-axis and z-axis are changing substantially. In a third stage (frame 280 to frame 360), the terminal is in the stable state with the screen facing downward, the values of z-axis gravitational acceleration data are close to −9.8, while the values of the y-axis gravitational acceleration data are close to 0.

Therefore, in one possible implementation, when it is detected that the values of the z-axis gravitational acceleration data in the N frames gravitational acceleration data change from the fourth value to the second value and the values of the y-axis gravitational acceleration data change from the fourth value to the third value, the terminal determines that it may flip the screen from backward vertical to downward, and input the N frames gravitational acceleration data into the action identification model for action identification. Wherein, the fourth value is greater than the third value, the third value is greater than the second value, the fourth value is positive, the second value is negative, for example, the fourth value is 5, the third value is 0, and the second value is −9.8.

5. The screen is flipped from backward vertical to forward horizontal.

In response to a change of x-axis gravitational acceleration data from a third value to a first value in the N frames of the gravitational acceleration data, and a change of y-axis gravitational acceleration data from a fourth value to a third value, the N frames of gravitational acceleration data are inputted into the action identification model to acquire the action identification result output by the action identification model.

Figure 13:
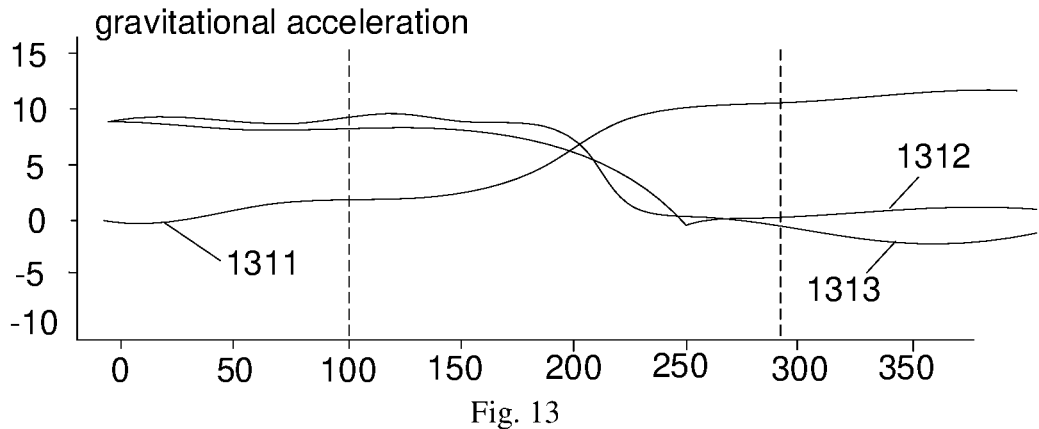
FIG. 13 illustrates a schematic diagram of a change in gravitational acceleration data, when in the process of flipping the screen from back vertical to forward horizontal.

FIG. 13 illustrates the change of gravitational acceleration data during the process of flipping the screen from backward vertical to forward horizontal. The horizontal axis indicates the number of frames of the sampled frames, the vertical axis indicates the value of the gravitational acceleration data, the first curve 1311 indicates the x-axis gravitational acceleration data, the second curve 1312 indicates the y-axis gravitational acceleration data, and the third curve 1313 indicates the z-axis gravitational acceleration data.

It can be seen that in a first stage (frame 0 to frame 100), the terminal is in a stable state with the screen facing backward vertical, the values of y-axis gravitational acceleration data are normally greater than 5, the values of z-axis gravitational acceleration data fluctuate around 5. In a second stage (frame 100 to frame 280), the terminal is in the process of flipping the screen from backward vertical to forward horizontal, during the flipping process, the values of gravitational acceleration data in the three axes of x-axis, y-axis and z-axis are changing substantially. In a third stage (frame 280 to frame 360), the terminal is in the stable state with the screen facing forward horizontal, the values of x-axis gravitational acceleration data are close to 9.8, while the values of the y-axis gravitational acceleration data are close to 0.

Therefore, in one possible implementation, when it is detected that the values of the x-axis gravitational acceleration data in the N frames gravitational acceleration data change from the third value to the first value and the values of the y-axis gravitational acceleration data change from the fourth value to the third value, the terminal determines that it may flip the screen from backward vertical to forward horizontal and input the N frames gravitational acceleration data into the action identification model for action identification. Wherein, the first value is greater than the fourth value, the fourth value is greater than the third value, the first value and the fourth value are positive, for example, the first value is 9.8, the fourth value is 5, and the third value is 0.

6. The screen is flipped from backward vertical to forward vertical.

In response to a change of z-axis gravitational acceleration data from a fourth value to a third value in the N frames of the gravitational acceleration data, and a change of y-axis gravitational acceleration data from a fourth value to a first value, the N frames of gravitational acceleration data are inputted into the action identification model to acquire the action identification result, output by the action identification model.

Figure 14:
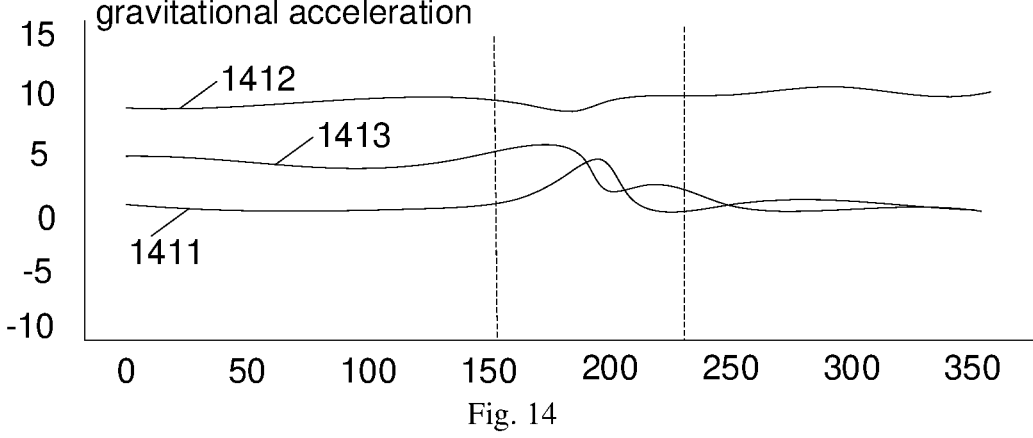
FIG. 14 illustrates a schematic diagram of a change in gravitational acceleration data, when in the process of flipping the screen from back vertical to forward vertical.

FIG. 14 illustrates the change of gravitational acceleration data during the process of flipping the screen from backward vertical to forward vertical. The horizontal axis indicates the number of frames of the sampled frames, the vertical axis indicates the value of the gravitational acceleration data, the first curve 1411 indicates the x-axis gravitational acceleration data, the second curve 1412 indicates the y-axis gravitational acceleration data, and the third curve 1413 indicates the z-axis gravitational acceleration data.

It can be seen that in a first stage (frame 0 to frame 150), the terminal is in the stable state with the screen facing backward vertical, the values of y-axis gravitational acceleration data are normally greater than 5, the values of z-axis gravitational acceleration data fluctuate around 5, and the values of x-axis gravitational acceleration data tend to 0. In a second stage (frame 150 to frame 230), the terminal is in the process of flipping the screen from backward vertical to forward vertical, during the flipping process, the values of gravitational acceleration data in the two axes of x-axis and z-axis are changing substantially. In a third stage (frame 230 to frame 360), the terminal is in the stable state with the screen facing forward vertical, the values of y-axis gravitational acceleration data are close to 9.8, while the values of the z-axis gravitational acceleration data are close to 0.

Therefore, in one possible implementation, when it is detected that the values of the z-axis gravitational acceleration data in the N frames gravitational acceleration data change from the fourth value to the third value and the values of the y-axis gravitational acceleration data change from the fourth value to the first value, the terminal determines that it may flip the screen from backward vertical to forward vertical and input the N frames gravitational acceleration data into the action identification model for action identification. Wherein, the first value is greater than the fourth value, the fourth value is greater than the third value, the first value and the fourth value are positive, for example, the first value is 9.8, the fourth value is 5, and the third value is 0.

7. The screen is flipped from backward vertical to upward.

In response to a change of z-axis gravitational acceleration data from a fourth value to a first value in the N frames of the gravitational acceleration data, and a change of y-axis gravitational acceleration data from a fourth value to a third value, the N frames of gravitational acceleration data are inputted into the action identification model to acquire the action identification result output by the action identification model.

Figure 15:
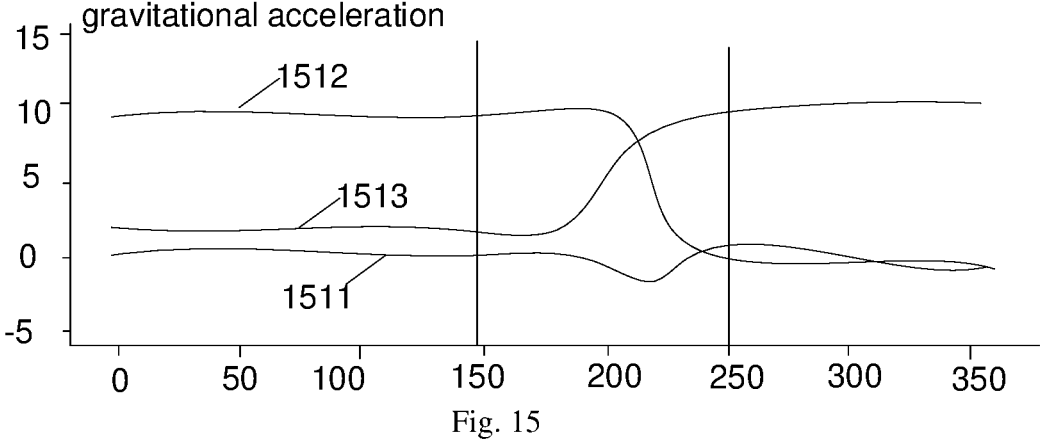
FIG. 15 illustrates a schematic diagram of a change in gravitational acceleration data, when in the process of flipping the screen from back vertical to upward.

FIG. 15 illustrates the change of gravitational acceleration data during the process of flipping the screen from backward vertical to upward. The horizontal axis indicates the number of frames of the sampled frames, the vertical axis indicates the value of the gravitational acceleration data, the first curve 1511 indicates the x-axis gravitational acceleration data, the second curve 1512 indicates the y-axis gravitational acceleration data, and the third curve 1513 indicates the z-axis gravitational acceleration data.

It can be seen that in a first stage (frame 0 to frame 150), the terminal is in the stable state with the screen facing backward vertical, the values of y-axis gravitational acceleration data are normally greater than 5, the values of z-axis gravitational acceleration data fluctuate around 5, the values of x-axis gravitational acceleration data tend to 0. In a second stage (frame 150 to frame 230), the terminal is in the process of flipping the screen from backward vertical to upward, during the flipping process, the values of gravitational acceleration data in the two axes of y-axis and z-axis are changing substantially. In a third stage (frame 230 to frame 360), the terminal is in the stable state with the screen facing upward, the values of y-axis gravitational acceleration data are close to 0, while the values of the z-axis gravitational acceleration data are close to 9.8.

Therefore, in one possible implementation, when it is detected that the values of the z-axis gravitational acceleration data in the N frames gravitational acceleration data change from the fourth value to the first value and the values of the y-axis gravitational acceleration data change from the fourth value to the third value, the terminal determines that it may flip the screen from backward vertical to upward and input the N frames gravitational acceleration data into the action identification model for action identification. Wherein, the first value is greater than the fourth value, the fourth value is greater than the third value, the first value and the fourth value are positive, for example, the first value is 9.8, the fourth value is 5, and the third value is 0.

It should be noted that in addition to the gravitational acceleration data collected by the accelerometer, the terminal may also identify action based on the angular velocity data collected by the angular velocity sensor in order to improve the accuracy of the action identification, which is not limited in this embodiment.

At block 802, an image is captured by the camera, in response to identifying the pre-action of the graphic code display. The pre-action is an action prior to displaying the graphic code to a code scanning device.

The implementation of this block may be referred to above-mentioned blocks 202, 202A, 202B, and 202C, and this embodiment will not be repeated here.

At block 803, the captured image is inputted into the code scanning device detection model to acquire the detection result output by the code scanning device detection model.

In one possible implementation, the terminal is provided with a pre-trained code scanning device detection model, the input of the code scanning device detection model is images, and the output of the code scanning device detection model is whether the image contains a code scanning device.

Since the code scanning device detection model needs to be deployed and run in the terminal, in order to reduce the size of the model while ensuring the accuracy of the model detection and improve the model inference speed, the code scanning device detection model in this embodiment is a mobile convolutional neural network model, and the convolutional layer of the code scanning device detection model uses depth separable convolution, i.e., the convolutional layer uses a convolution of the form depthwise+pointwise for convolutional operations.

For example, the code scanning device detection model is based on mobilenet–v3, some of the convolutional layers use deep separable convolution to improve the model inference speed without reducing accuracy.

In the process of training the code scanning device detection model, softmax loss and focal loss are used for joint training, which reduces the impact of the imbalance between positive and negative samples on model training and further improve the quality of the model.

In addition, for the training of the code scanning device detection model, before the model is deployed, the model may be further streamlined by cutting the network, optimizing the network and quantizing the model to improve the model inference speed to meet the real-time detection needs of the terminal.

Regarding the construction of samples during training, in one possible implementation, images of different types, different sizes (size of the code scanning device in the image), different parts and different environments (e.g., different brightness and darkness scenes) of the code scanning device may be used as samples for training to improve the robustness as well as the detection accuracy of different models.

In some embodiments, the code scanning device detection model has the function of getting the position of the code scanning device in the image and/or outputting the device type of the code scanning device, in addition to the function of detecting whether the image contains the code scanning device.

At block 804, the current scene information is acquired in response to the detection result indicating that the image contains the code scanning device. The current scene information includes at least one of geographic location information, time information and recent code scanning information.

When the captured image contains the code scanning device, the terminal further acquires the current scene information indicating the currently located scene, wherein the current scene information contains information of different dimensions to improve the accuracy of the subsequently determined scene.

In this embodiment, the current scene information includes the geographic location information indicating the current location, the time information indicating the current moment, and the recent code scanning information indicating the type of the graphic code displayed at the recent code scan.

In some embodiments, the geographic location information is determined by the terminal based on at least one of the base station information, network connection information (such as WiFi connection information) or positioning information (such as GPS information), and the geographic location information may be the latitude and longitude coordinates, or the name of location. The present disclosure embodiment does not limit the way and the presentation form of acquiring the geographic location information.

In some embodiments, the time information may be the current time or the time period of which the current time belongs (such as commuting time period, working time period).

In some embodiments, the recent code scanning information includes the type of the graphic code displayed at the recent code scan, the moment of the recent code scan and the geographic location information at the recent code scan, etc., which is not limited in this embodiment.

In an illustrative example, the current scene information acquired by the terminal includes the following: convenience store XX (the geographic location information), lunchtime (the time information) and scan code to exit Station B (the recent code scanning information).

At block 805, a graphic code type is determined based on the current scene information.

Further, the terminal identifies the current application scene based on the acquired current scene information and determines the graphic code type matching the current application scene.

In one possible implementation, the terminal divides the application scene into a commuting scene and a commodity payment scene. Accordingly, the terminal determines the graphic code type to be a ride code in response to the scene indicated by the current scene information being a commuting scene; the terminal determines the graphic code type to be a payment code in response to the scene indicated by the current scene information being a commodity payment scene.

In some embodiments, the terminal determines that the current application scene is a commuting scene when the geographic location information indicates that it is located at a commuting station, and/or, when the time information indicates that it is at a commuting time period, and/or when the recent code scanning information indicates that it is a transportation inbound code scan information.

In an illustrative example, the terminal determines that the current application scene is the commuting scene when the current scene information acquired by the terminal including Station B (the geographic location information), commuting time period (the time information) and scanning code to enter Station A (the recent code scanning information).

In some embodiments, the terminal determines that the current scene is a commodity payment scene, if the current scene indicates that the current application scene is not the commuting scene.

In an illustrative example, the current scene information acquired by the terminal includes the following: convenience store XX (the geographic location information), lunchtime (the time information) and scanning code to exit Station B (the recent code scanning information).

It should be noted that this embodiment is only illustrative with the commuting scene and the commodity payment scene, in other possible implementations, the scenes may be further divided according to actual needs and set corresponding payment code types for different scenes, which is not limited in embodiments of the present disclosure.

At block 806, the graphic code belonging to the graphic code type is displayed.

In one possible implementation, when a unique graphic code type is determined based on the current scene information, the terminal displays the graphic code belonging to the graphic code type.

Figure 16:
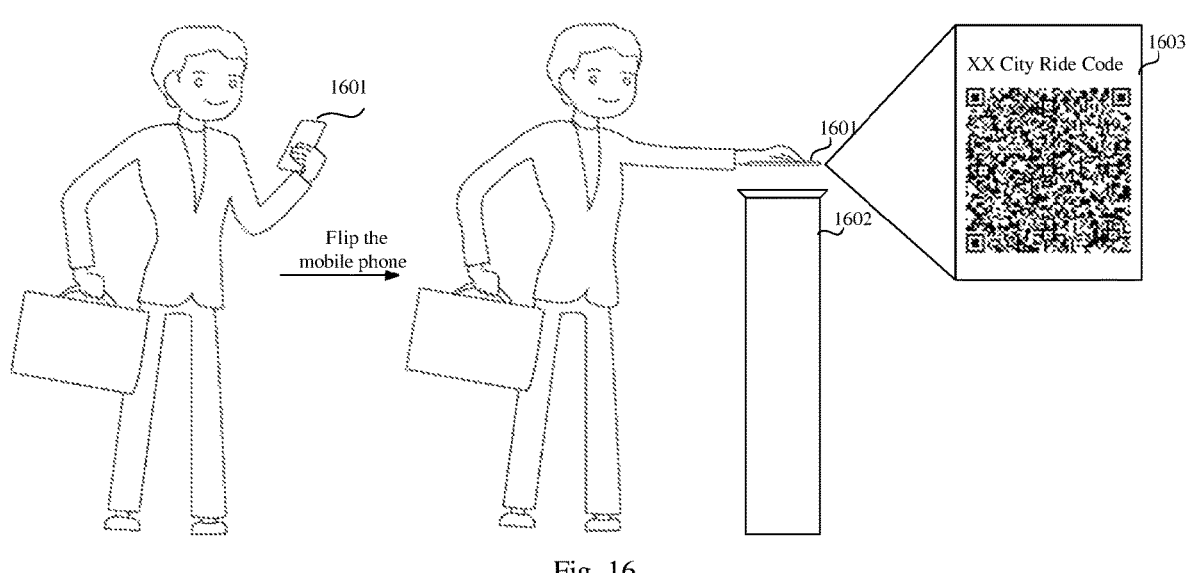
FIG. 16 illustrates another schematic diagram of a process for displaying the graphic code according to an exemplary embodiment of the disclosure.

Schematically, as shown in FIG. 16, when the mobile phone 1601 determines that the user is located at an underground station based on the acquired current scene information, the mobile phone 1601 displays an underground ride code 1603 when the user flips the mobile phone 1601 and places the screen squarely against the code scanning device 1602 of the underground gate.

Figure 17:
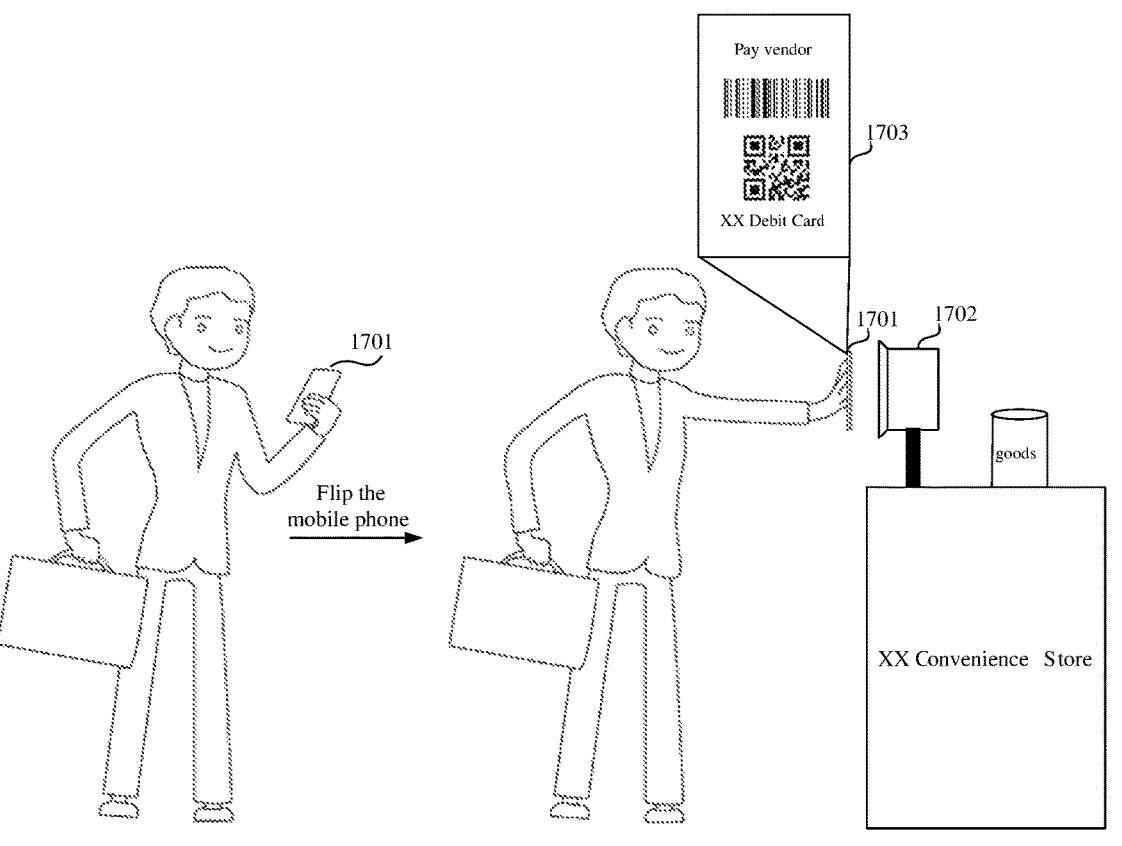
FIG. 17 illustrates another schematic diagram of a process for displaying the graphic code according to an exemplary embodiment of the disclosure.

As shown in FIG. 17, when the mobile phone 1701 determines that the user is located in a convenience store based on the acquired current scene information, the mobile phone 1701 displays a payment code 1703 when the user flips the mobile phone 1701 and places the screen squarely against the code scanning device 1702 of the vendor.

In some embodiments, when there are at least two graphic codes belonging to the graphic code type, the terminal displays the most frequently used graphic code. For example, if the graphical code type is the payment code type and the graphic codes belonging to the payment code type include a payment code 1 and a payment code 2, the terminal will display the more frequently used payment code 1.

In this embodiment, based on the current scene information acquired, the terminal determines the current application scene and the type of graphic code matching the current application scene, and then displays the graphic code belonging to the graphic code type, avoiding the user from switching the automatically displayed graphic code and improving the accuracy of the automatic display of graphic codes in different scenes.

Normally, the size of the code scanning device in the captured image is relatively large due to the close distance (e.g., around 10 cm) between the terminal displaying the graphic code and the code scanning device. In order to avoid mis-display of the graphic code due to misidentification of the remote code scanning device by the terminal when there is no demand for graphic code display. In one possible implementation, in response to the detection result indicating the image contains the code scanning device, the terminal further acquires the size of the code scanning device in the image, and displays the graphic code when the size is larger than the size threshold, and does not display the graphic code when the size is smaller than the size threshold. For example, the size threshold is 200px*200px.

In some embodiments, the size of the code scanning device in the image may be determined based on the bounding box of the code scanning device in the detection result.

In some special situations, for example, when the user is buying a commodity at a convenience store located in an underground station, the terminal cannot accurately determine the current application scene based on the current scene information. In such situation, in order to improve the efficiency of the user in switching graphic code (the initial display of the graphic code does not meet the actual needs of the user), in one possible implementation, the terminal provides a shortcut switching control in the interface for the user to use. On the basis of FIG. 8, as shown in FIG. 18, the above block 806 may be replaced by the block 806A and the block 806B as follows; the block 807 may follow the block 806B.

At block 806A, in response to determining at least two of the graphic code types based on the current scene information, a target graphic code type is determined from the at least two of the graphic code types, and the graphic code type other than the target graphic code type is determined as a candidate graphic code type.

In some embodiments, the target graphic code type may be the more frequently used graphic code type of at least two graphic code types, or the graphic code type that matches the application scene more closely, or a random graphic code type of at least two graphic code types.

For example, when the geographic location information acquired includes station A and convenience store XX (convenience store XX is located in station A), the terminal cannot directly determine whether the user needs to scan the code to enter station A or to scan the code to pay, at this time, the target graphic code type may be determined as the payment code and the candidate graphic code type may be determined as the ride code.

At block 806B, the graphic code belonging to the target graphic code type and a switching control corresponding to the candidate graphic code type are displayed.

In some embodiments, when the target graphic code needs to be displayed, the terminal gives priority to the graphic code belonging to the target graphic code type. In order to improve the efficiency of the user in switching the graphic code, the terminal displays the graphic code while displaying switching control corresponding to the candidate graphic code type in the user interface, and the switching control is used to trigger a switch to display the graphic code belonging to the candidate graphic code type.

The number of the switching controls corresponds to the number of the candidate graphic code types, i.e., different candidate graphic code types correspond to different switching controls.

Figure 19:
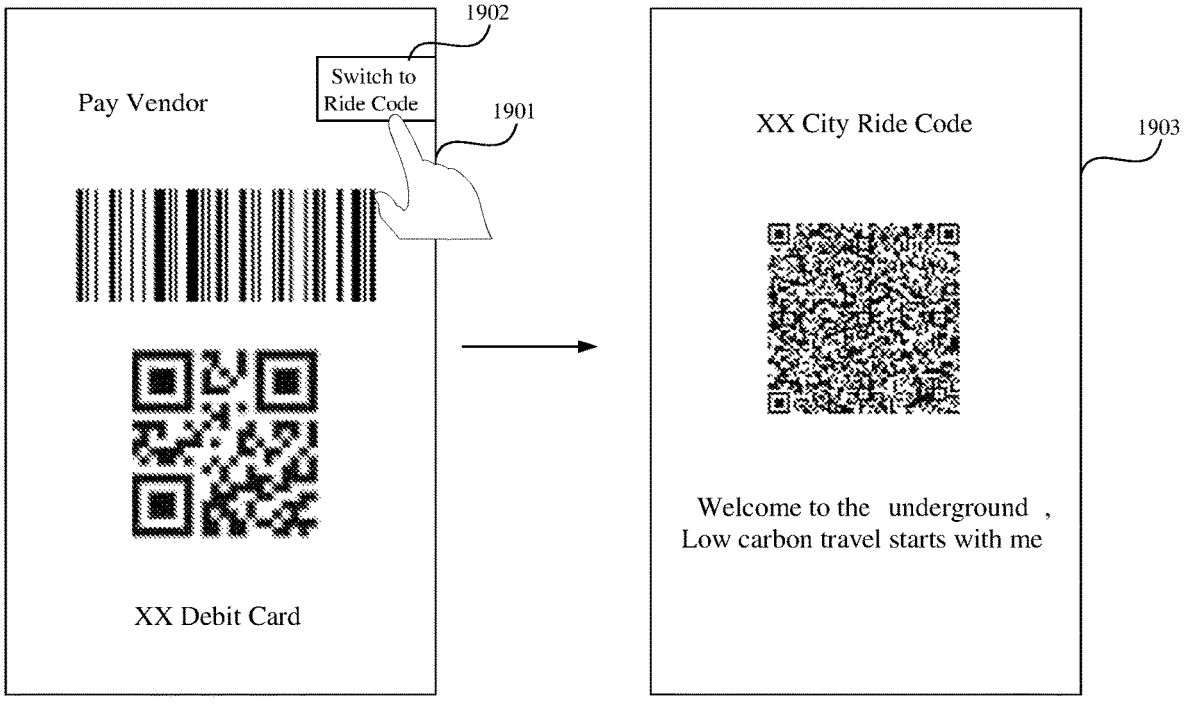
FIG. 19 illustrates a schematic diagram of interface for switching the graphic code process according to an exemplary embodiment of the disclosure.

Exemplarily, as shown in FIG. 19, the terminal determines that the target graphic code type is the payment code and the candidate graphic code type is the ride code. When the graphic code is displayed, the terminal displays the payment code 1901 in the user interface and displays the switching control 1902 corresponding to the ride code.

At block 807, the graphic code belonging to the candidate graphic code type is displayed, in response to a trigger operation on the switching control.

When the displayed graphic code does not meet the actual demand of the user, the user may switch the graphic code through the switching control. Accordingly, when a trigger operation is triggered on the switching control, the terminal switches to display the graphic code belonging to the candidate graphic code type without the need for the user to manually open the application corresponding to the candidate graphic code type and enter the graphic code display entry.

Exemplarily, as shown in FIG. 19, when it is necessary to use the terminal to scan the ride code for entering the underground station, the user may trigger the terminal to switch to display the ride code 1903 by clicking on the switching control 1902.

In this embodiment, when the application scene cannot be accurately judged based on the current scene information, the terminal displays the switching control while displaying the graphic code, so that the user may quickly switch to the graphic code to be displayed through the switching control, simplifying the operation process of switching the graphic code and improving the efficiency of switching the graphic code.

In other possible implementations, when the detection result contains the code scanning device type, the terminal may further determine the graphic code type that matches the code scanning device type and display the graphic code belonging to the graphic code type, improving the accuracy of the graphic code display.

For example, when the detection result indicates that the code scanning device in the image is an underground gate scanner, the terminal determines that the graphic code type is the ride code; when the detection result indicates that the code scanning device in the image is a vendor scanning gun, the terminal determines that the graphic code type is the payment code.

In some embodiments, when training the code scanning device detection model for detecting code scanning device, the training sample includes a code scanning device type label. During the training of the model, the model parameters are adjusted using the code scanning device type label as supervision so that the predicted code scanning device type output of the model tends to that code scanning device type label.

In the related graphic code display process, since the user may observe the display position of the graphic code in the screen in advance, the relative position between the terminal screen and the code scanning device may be adjusted based on the display position to improve the code scanning success rate of the code scanning device. In the present disclosure embodiment, the user cannot observe the display position of the graphic code before the terminal displays the graphic code, so it may affect the success rate of the code scanning.

In order to improve the success rate of the code scanning, in one possible implementation, when the detection result indicates that the image contains the code scanning device, the terminal further determines the image position of the code scanning device in the image, so as to determine the graphic code display position based on the image position of the code scanning device in the image, and then displays the graphic code at the graphic code display position. By adjusting the graphic code display position in the interface, it achieves an effect similar to that of manually adjusting the relative orientation of the screen by the user and improves the success rate of the code scanning.

When the image position of the code scanning device in the image is deflected to the upper part (compared to the image position of the code scanning device for the standard graphic code display action), the terminal shifts the graphic code display position upward (based on the graphic code display position for the standard graphic code display action). When the image position of the code scanning device in the image is deflected to the lower part, the terminal shifts the graphic code display position downward. When the image position of the code scanning device in the image is deflected to the left part, the terminal shifts the display position of the graphic code to the left. When the image position of the code scanning device in the image is deflected to the right part, the terminal shifts the display position of the graphic code to the right.

In this embodiment, the terminal dynamically adjusts the graphic code display position according to the image position of the code scanning device in the image, achieving a similar effect to the user manually adjusting the relative orientation of the screen and improving the success rate of the code scanning device in the automatic graphic code display scheme.

Figure 20:
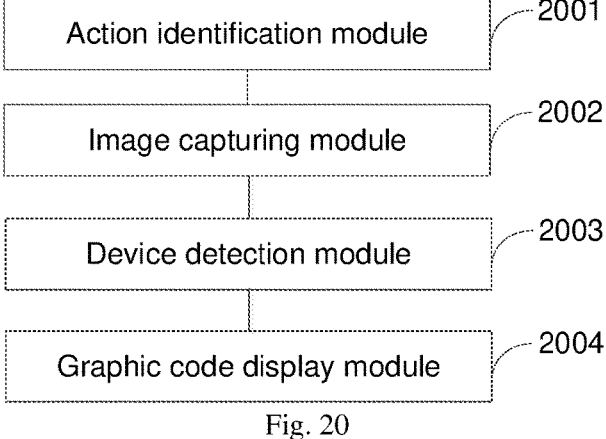
FIG. 20 illustrates a structural diagram of a graphic code display device according to an embodiment of the disclosure.

FIG. 20 illustrates a structural diagram of a graphic code display device according to an embodiment of the disclosure. The device may be implemented as all or part of a terminal by software, hardware or a combination of both. The device comprises: an action identification module 2001, configured to identify an action, in an unlocked state, based on sensor data collected by a sensor; an image capturing module 2002, configured to capture an image by a camera, in response to an identified pre-action, the pre-action being the action prior to displaying the graphic code to a code scanning device; a device detection module 2003, configured to detect the code scanning device in the captured image to acquire detection result; a graphic code display module 2004, configured to display a graphic code, in response to the detection result indicating that the image contains the code scanning device.

In some embodiments, the image capturing module 2002 is configured to determine a flipping action as the pre-action and capture image by front camera, in response to identifying the flipping action meets flipping direction condition, wherein the front camera is on one side of the screen.

In some embodiments, the image capturing module 2002 is configured to determine the flipping action as the pre-action, in response to identifying the flipping action in a vertical state and the flipping action indicating a change in screen orientation from a first direction to a second direction, the first direction and the second direction being relative directions; OR determine the flipping action as the pre-action, in response to identifying the flipping action that changes from a vertical state to a horizontal state, with the screen facing downward in the horizontal state; OR determine the flipping action as the pre-action, in response to identifying a flipping action that changes from a vertical state to a horizontal state, with the screen facing upward in the horizontal state.

In some embodiments, the image capturing module 2002 is configured to determine a shaking action as the pre-action and capture image by front camera, the front camera being on one side of screen, in response to the identified being the shaking action in a preset direction, and number of the shaking action being a preset number; OR determine a knocking action as the pre-action and capture image by front camera, the front camera being on one side of screen, in response to the identified action being the knocking action and number of the knocking action being a preset number.

In some embodiments, the action identification module 2001 comprises: a data acquiring unit, configured to acquire N frames of gravitational acceleration data, continuously collected by the accelerometer, each frame of the gravitational acceleration data containing an acceleration value in the three-axis direction, and N being an integer greater than or equal to 2.

In some embodiments, an identification unit is configured to input the N frames of gravitational acceleration data into an action identification model to acquire an action identification result output by the action identification model, the action identification model being a convolutional neural network model.

In some embodiments, the identification unit is configured to in response to a change of z-axis gravitational acceleration data from a first value to a second value in the N frames of the gravitational acceleration data, input the N frames of gravitational acceleration data into the action identification model to acquire the action identification result, output by the action identification model; or in response to a change of z-axis gravitational acceleration data from a first value to a third value in the N frames of gravitational acceleration data and a change of x-axis gravitational acceleration data from the third value to the first value, input the N frames of gravitational acceleration data into the action identification model to acquire the action identification result output by the action identification model; or in response to a change of z-axis gravitational acceleration data from a first value to a third value in the N frames of gravitational acceleration data and a change of y-axis gravitational acceleration data from the third value to the first value, input the N frames of gravitational acceleration data into the action identification model to acquire the action identification result output by the action identification model; or in response to a change of z-axis gravitational acceleration data from a fourth value to a second value in the N frames of gravitational acceleration data and a change of y-axis gravitational acceleration data from the fourth value to the third value, input the N frames of gravitational acceleration data into the action identification model to acquire the action identification result output by the action identification model; or in response to a change of x-axis gravitational acceleration data from a third value to a first value in the N frames of gravitational acceleration data and a change of y-axis gravitational acceleration data from the fourth value to the third value, input the N frames of gravitational acceleration data into the action identification model to acquire the action identification result output by the action identification model; or in response to a change of z-axis gravitational acceleration data from a fourth value to a third value in the N frames of gravitational acceleration data and a change of y-axis gravitational acceleration data from the fourth value to the first value, input the N frames of gravitational acceleration data into the action identification model to acquire the action identification result output by the action identification model; or in response to a change of z-axis gravitational acceleration data from a fourth value to a first value in the N frames of gravitational acceleration data and a change of y-axis gravitational acceleration data from the fourth value to the third value, input the N frames of gravitational acceleration data into the action identification model to acquire the action identification result output by the action identification model; wherein, the first value is greater than the fourth value, the fourth value is greater than the third value, the third value is greater than the second value, the first value and the fourth value is a positive value, and the second value is a negative value.

In some embodiments, the graphic code display module 2004 comprises: a scene information acquisition unit, configured to acquire current scene information, the current scene information includes at least one of geographic location information, time information, and recent code scanning information.

A first type determination unit, configured to determine a graphic code type based on the current scene information.

A graphic code display unit, configured to display the graphic code belonging to the graphic code type.

In some embodiments, the first type determination unit is configured to determine the graphic code type being a ride code, in response to the current scene information indicating a scene as a commuting scene, wherein, in the commuting scene, the geographic location information indicates a commuting ride station, and/or, the time information indicates a commuting time period, and/or, the recent code scanning information indicates a transportation inbound code scan information; determine the graphic code type being a payment code, in response to the current scene information indicating a commodity payment scene.

In some embodiments, the graphic code display unit is configured to in response to determining at least two of graphic code types based on the current scene information, determine a target graphic code type from the at least two of the graphic code types and determine a graphic code type other than the target graphic code type as a candidate graphic code type; display the graphic code belonging to the target graphic code type and display a switching control corresponding to the candidate graphic code type.

The device further comprises: a switch display module, configured to display the graphic code belonging to the candidate graphic code type, in response to a trigger operation on the switching control.

In some embodiments, the graphic code display module 2004 comprises: a first type determination unit, configured to acquire a code scanning device type contained in the detection result, and determine the graphic code type matching the code scanning device type; display the graphic code belonging to the graphic code type; a graphic code display unit, configured to display the graphic code belonging to the graphic code type.

In some embodiments, the graphic code display module 2004 further comprises: a location determination unit, configured to determine a display position for the graphic code, based on an image position of the code scanning device in the image, in response to the detection result indicating the image containing the code scanning device; a graphic code display unit, configured to display the graphic code at the graphic code display position.

In some embodiments, the graphic code display module 2004 is further configured to display the graphic code, in response to the detection result indicating the image containing the code scanning device and a size of the code scanning device in the image being greater than a size threshold.

In some embodiments, the device detection module 2003 is configured to input the captured image into the code scanning device detection model to acquire the detection result output by the code scanning device detection model, wherein the code scanning device detection model being a mobile convolutional neural network model, convolutional layer of the code scanning device detection model using depth separable convolution, and the code scanning device detection model being jointly trained with softmax loss and focal loss.

In summary, in an implementation of this disclosure, the terminal identifies whether the user performs the pre-action by identifying action on the sensor data collected by the sensor, and further captures image by the camera when the pre-action is identified; and automatically displays the graphic code when the captured image is detected to contain the code scanning device. In the entire graphic code display process, the user only needs to perform the pre-action without pre-opening an application and the graphic code display function, simplifying the graphic code display process. Moreover, after the pre-action is identified, the image identification technology is used to detect the code scanning device, which helps to reduce the probability of mis-display of the graphic code, and improve the accuracy of the timing of the graphic code display and the security of the graphic code display.

In the above-mentioned device embodiment, the process of implementing the functions of the individual modules or units may be referred to the method embodiment above. This embodiment will not be repeated here.

Figure 21:
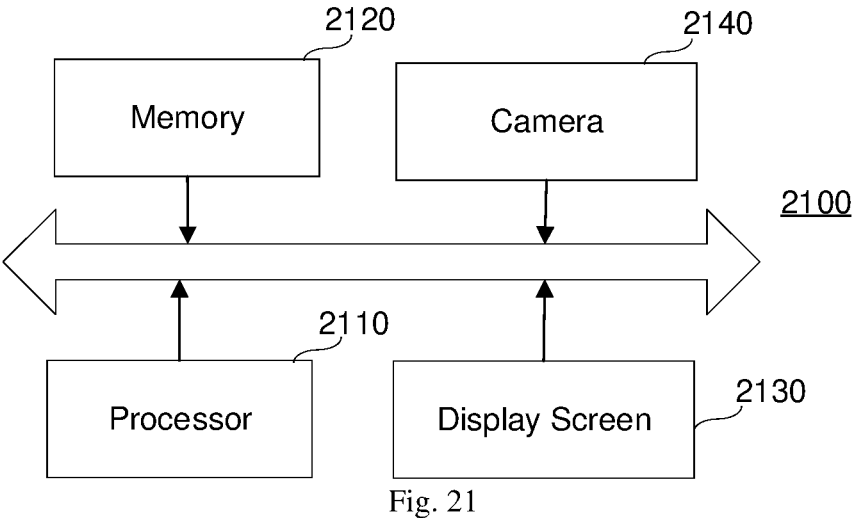
FIG. 21 illustrates a structural diagram of a terminal according to an exemplary embodiment of the disclosure.

FIG. 21 illustrates a structural diagram of a terminal according to an exemplary embodiment of the disclosure. The terminal 2100 may be a smartphone, a tablet computer, a wearable device, etc. The terminal 2100 in the present disclosure may comprise one or more of the following components: processor 2110, memory 2120, display screen 2130 and camera 2140.

The processor 2110 may include one or more processing cores. The processor 2110 takes various interfaces and wires to connect various parts within the entire electronic device. The processor 2110 may perform various functions and process data of the electronic device 100 by running or executing instructions, programs, code sets, or instruction sets stored in the memory 2120, and by invoking data stored in the memory 2120. In some embodiments, the processor 2110 may be achieved in the hardware form by taking at least one of a digital signal processing (DSP), a field-programmable gate array (FPGA), a programmable logic array (PLA). The processor 2110 may integrate one or a combination of: a central processing unit (CPU), a graphics processing unit (GPU), a neural-network processing unit (NPU) and a modem. The CPU may substantially process the operating system, the user interface, applications, and so on; the GPU may be configured to render and draw the displayed content on the display screen 2130; the NPU may be configured to implement Artificial Intelligence (AI) functions; the modem may be configured for wireless communication. It shall be understood that the modem may not be integrated into the processor 2110, and may be configured as an independent communication chip.

The memory 2120 may include a random-access memory (RAM), or a read-only memory (ROM). In some embodiments, the memory 2120 may include a non-transitory computer-readable storage medium. The memory 2120 may be configured to store instructions, programs, codes, code sets or instruction sets. The memory 2120 may include a program storage area and a data storage area. The program storage area may store instructions for implementing an operating system, instructions for implementing at least one function (such as a touch function, a sound playing function, an image displaying function, and so on), instructions for implementing each of the following method embodiments, and so on. The data storage area may store data created while the terminal 2100 is being used, such as audio data, phone books, and so on.

The display screen 2130 is a display component for displaying images. The display screen 2130 may be designed as a full screen, curved screen, shaped screen, double-sided screen, or foldable screen, which are not limited by the embodiments. In addition to having a display function, the display screen 2130 may also have a touch function, i.e. the display screen 2130 is a touch display screen.

The camera 2140 is a component for capturing images. In some embodiments, the camera 2140 may be an RGB camera or a depth camera. In this disclosure embodiment, the display screen 2130 is provided with a camera 2140 (i.e., a front camera) on one side of the display screen 2130, which is used to capture images on the side facing the display screen 2130.

In addition, it will be understood by those skilled in the art that the structure of the terminal 2100 illustrated in the accompanying drawings above does not constitute a limitation of the terminal 2100, and that the terminal 2100 may include more or fewer components than illustrated, or a combination of certain components, or a different arrangement of components. For example, the terminal 2100 may further include components such as radio-frequency circuitry, a sensor, an audio circuit, a Wireless Fidelity (Wi-Fi) component, a power supply, a Bluetooth component, and other components, which are not described herein.

Embodiments of the present disclosure further provide a computer readable medium having at least one instruction stored thereon, the at least one instruction being loaded and executed by the processor to implement the graphic code display method as described in the above embodiments.

Embodiments of the present disclosure provide a computer program product or computer program, the computer program product or computer program including computer instructions, the computer instructions being stored in a computer-readable storage medium. A processor of the terminal reads the computer instructions from the computer-readable storage medium, and the processor executes the computer instructions such that the terminal performs the graphic code display method provided in the above aspect.

Those skilled in the art should be aware that in one or more of the above examples, the functions described in the embodiments of the present disclosure may be implemented with hardware, software, firmware, or any combination thereof. When implemented using software, these functions may be stored in a computer-readable medium or transmitted as one or more instructions or code on a computer-readable medium. The computer-readable medium includes computer storage medium and communication medium, where the communication medium includes any medium that facilitates the transmission of computer programs from one place to another. The storage medium may be any available medium accessible to a general purpose or specialized computer.

The descriptions above are merely optional embodiments of the present disclosure, but are not intended to limit the present disclosure. Any modifications, equivalent replacements, or improvements made within the spirit and principle of the present disclosure should fall within the protection scope of the present disclosure.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

What is claimed is:

1. A graphic code display method, comprising:
   identifying a pre-action, in an unlocked state, based on sensor data collected by a sensor;
   capturing an image by a camera in response to the identified pre-action, wherein the pre-action is an action prior to displaying the graphic code to a code scanning device;
   detecting the code scanning device in the captured image to acquire a detection result; and displaying the graphic code, in response to the detection result indicating that the image contains the code scanning device.

2. The method according to claim 1, wherein the step of capturing an image by a camera, in response to an identified pre-action, comprises:
   determining a flipping action as the pre-action and capturing the image by a front camera, in response to identifying that the flipping action meets a flipping direction condition, wherein the front camera is on one side of a screen.

3. The method according to claim 2, wherein the step of determining a flipping action as the pre-action and capturing the image by the front camera, in response to identifying that the flipping action meets the flipping direction condition, comprises:
   determining the flipping action as the pre-action, in response to identifying the flipping action in a vertical state, the flipping action indicating a change in screen orientation from a first direction to a second direction, the first direction and the second direction being relative directions; OR
   determining the flipping action as the pre-action, in response to identifying the flipping action that changes from the vertical state to a horizontal state, with the screen facing downward in the horizontal state; OR
   determining the flipping action as the pre-action, in response to identifying the flipping action that changes from the vertical state to the horizontal state, with the screen facing upward in the horizontal state.

4. The method according to claim 1, wherein the step of capturing an image by a camera, in response to an identified pre-action, comprises:
   determining a shaking action as the pre-action and capturing the image by a front camera, the front camera being on one side of a screen, in response to the identified action being the shaking action in a preset direction and a number of the shaking action being a preset number; OR
   determining a knocking action as the pre-action and capturing the image by the front camera, the front camera being on one side of the screen, in response to the identified action being the knocking action and a number of the knocking action being a preset number.

5. The method according to claim 1, wherein the step of identifying an action, in an unlocked state, based on sensor data collected by a sensor comprises:
   acquiring N frames of gravitational acceleration data continuously collected by an accelerometer, each frame of the gravitational acceleration data containing an acceleration value in a three-axis direction, N being an integer greater than or equal to 2;
   inputting the N frames of gravitational acceleration data into an action identification model to acquire an action identification result output by the action identification model, the action identification model being a convolutional neural network model.

6. The method according to claim 5, wherein the step of inputting the N frames of gravitational acceleration data into an action identification model to acquire an action identification result output by the action identification model comprises:
   in response to a change of z-axis gravitational acceleration data from a first value to a second value in the N frames of gravitational acceleration data, inputting the N frames of gravitational acceleration data into the action identification model to acquire the action identification result output by the action identification model; OR in response to a change of z-axis gravitational acceleration data from a first value to a third value in the N frames of gravitational acceleration data and a change of x-axis gravitational acceleration data from the third value to the first value, inputting the N frames of gravitational acceleration data into the action identification model to acquire the action identification result output by the action identification model; OR in response to a change of z-axis gravitational acceleration data from a first value to a third value in the N frames of gravitational acceleration data and a change of y-axis gravitational acceleration data from the third value to the first value, inputting the N frames of gravitational acceleration data into the action identification model to acquire the action identification result output by the action identification model; OR in response to a change of z-axis gravitational acceleration data from a fourth value to a second value in the N frames of gravitational acceleration data and a change of y-axis gravitational acceleration data from the fourth value to a third value, inputting the N frames of gravitational acceleration data into the action identification model to acquire the action identification result output by the action identification model; OR in response to a change of x-axis gravitational acceleration data from a third value to a first value in the N frames of gravitational acceleration data and a change of y-axis gravitational acceleration data from a fourth value to a third value, inputting the N frames of gravitational acceleration data into the action identification model to acquire the action identification result, output by the action identification model; OR in response to a change of z-axis gravitational acceleration data from a fourth value to a third value in the N frames of the gravitational acceleration data, and a change of y-axis gravitational acceleration data from a fourth value to a first value, inputting the N frames of gravitational acceleration data into the action identification model to acquire the action identification result, output by the action identification model; OR in response to a change of z-axis gravitational acceleration data from a fourth value to a first value in the N frames of the gravitational acceleration data, and a change of y-axis gravitational acceleration data from a fourth value to a third value, inputting the N frames of gravitational acceleration data into the action identification model to acquire the action identification result output by the action identification model;

wherein, the first value is greater than the fourth value, the fourth value is greater than the third value, the third value is greater than the second value, the first value and the fourth value are both positive values, and the second value is a negative value.

7. The method according to claim 1, wherein the step of displaying the graphic code comprises:

acquiring current scene information, the current scene information including at least one of geographic location information, time information, and recent code scanning information;

determining a graphic code type based on the current scene information;

displaying the graphic code belonging to the graphic code type.

8. The method according to claim 7, wherein the step of determining the graphic code type based on the current scene information comprises:

determining the graphic code type being a ride code, in response to the current scene information indicating a scene as a commuting scene, wherein in the commuting scene, the geographic location information indicates a commuting ride station, and/or, the time information indicates a commuting time period, and/or, the recent code scanning information indicates a transportation inbound code scan information;

determining the graphic code type being a payment code, in response to the current scene information indicating a commodity payment scene.

9. The method according to claim 7, wherein the step of displaying the graphic code belonging to the graphic code type comprises:

in response to determining at least two of graphic code types based on the current scene information, determining a target graphic code type from the at least two of the graphic code types and determining a graphic code type other than the target graphic code type as a candidate graphic code type;

displaying the graphic code belonging to the target graphic code type and displaying a switching control corresponding to the candidate graphic code type;

wherein after the displaying the graphic code belonging to the graphic code type, the method further comprises:

displaying the graphic code belonging to the candidate graphic code type, in response to a trigger operation on the switching control.

10. The method according to claim 1, wherein the step of displaying the graphic code further comprises:

acquiring a code scanning device type contained in the detection result, and determining the graphic code type matching the code scanning device type;

displaying the graphic code belonging to the graphic code type.

11. The method according to claim 1, wherein the step of displaying the graphic code further comprises:

determining a display position for the graphic code, based on an image position of the code scanning device in the image, in response to the detection result indicating the image containing the code scanning device;

displaying the graphic code at the display position.

12. The method according to claim 1, wherein the step of displaying the graphic code further comprises:

displaying the graphic code, in response to the detection result indicating the image containing the code scanning device and a size of the code scanning device in the image being greater than a size threshold.

13. The method according to claim 1, wherein the step of detecting the code scanning device in the captured image to acquire detection result further comprises:

inputting the captured image into the code scanning device detection model to acquire the detection result output by the code scanning device detection model, the code scanning device detection model being a mobile convolutional neural network model, a convolutional layer of the code scanning device detection model using depth separable convolution, the code scanning device detection model being jointly trained with softmax loss and focal loss.

14. A terminal, comprising: a processor and a memory configured to store instructions which, when executed by the processor, cause the one or more processors to:

identify a pre-action, in an unlocked state, based on sensor data collected by a sensor;

capture an image by a camera in response to the identified pre-action, wherein the pre-action is an action prior to displaying the graphic code to a code scanning device;

detect the code scanning device in the captured image to acquire a detection result; and display the graphic code, in response to the detection result indicating that the image contains the code scanning device.

15. The terminal of claim 14, wherein the instructions that cause the processor to capture an image by a camera, in response to an identified pre-action that, when executed, cause the processor to:

determine a flipping action as the pre-action and capturing the image by a front camera, in response to identifying that the flipping action meets a flipping direction condition, wherein the front camera is on one side of a screen.

16. The terminal of claim 15, wherein the instructions that cause the processor to determine a flipping action as the pre-action and capturing the image by the front camera, in response to identifying that the flipping action meets the flipping direction condition that, when executed, caused the processor to:

determine the flipping action as the pre-action, in response to identifying the flipping action in a vertical state, the flipping action indicating a change in screen orientation from a first direction to a second direction, the first direction and the second direction being relative directions; OR determine the flipping action as the pre-action, in response to identifying the flipping action that changes from the vertical state to a horizontal state, with the screen facing downward in the horizontal state; OR determine the flipping action as the pre-action, in response to identifying the flipping action that changes from the vertical state to the horizontal state, with the screen facing upward in the horizontal state.

17. The terminal of claim 14, wherein the instructions that cause the processor to capture an image by a camera, in response to an identified pre-action that, when executed, cause the processor to:

determine a shaking action as the pre-action and capturing the image by a front camera, the front camera being on one side of a screen, in response to the identified action being the shaking action in a preset direction and a number of the shaking action being a preset number; OR determine a knocking action as the pre-action and capturing the image by the front camera, the front camera being on one side of the screen, in response to the identified action being the knocking action and a number of the knocking action being a preset number.

18. A non-transitory computer readable storage medium having stored instructions that is executed by a processor of a terminal, cause the processor of a terminal to:

identify a pre-action, in an unlocked state, based on sensor data collected by a sensor;

capture an image by a camera in response to the identified pre-action, wherein the pre-action is an action prior to displaying the graphic code to a code scanning device;

detect the code scanning device in the captured image to acquire a detection result; and display the graphic code, in response to the detection result indicating that the image contains the code scanning device.

19. The non-transitory computer-readable medium of claim 18, wherein the instructions that cause the processor to capture an image by a camera, in response to an identified pre-action that, when executed, cause the processor to:

determine a flipping action as the pre-action and capturing the image by a front camera, in response to identifying that the flipping action meets a flipping direction condition, wherein the front camera is on one side of a screen.

20. The non-transitory computer-readable medium of claim 19, wherein the instructions that cause the processor to determine a flipping action as the pre-action and capturing the image by the front camera, in response to identifying that the flipping action meets the flipping direction condition that, when executed, cause the processor to:

determine the flipping action as the pre-action, in response to identifying the flipping action in a vertical state, the flipping action indicating a change in screen orientation from a first direction to a second direction, the first direction and the second direction being relative directions; OR determine the flipping action as the pre-action, in response to identifying the flipping action that changes from the vertical state to a horizontal state, with the screen facing downward in the horizontal state; OR determine the flipping action as the pre-action, in response to identifying the flipping action that changes from the vertical state to the horizontal state, with the screen facing upward in the horizontal state.

* * * * *